US012658625B2

(12) United States Patent
Kitaura et al.

(10) Patent No.: US 12,658,625 B2
(45) Date of Patent: Jun. 16, 2026

(54) ELECTRIC POWER CONVERTING DEVICE, AND BOARD-TO-BOARD CONNECTING PORTION

(71) Applicant: Panasonic Intellectual Property Management Co., Ltd., Osaka (JP)

(72) Inventors: Hidetoshi Kitaura, Osaka (JP); Hiroshi Ogura, Tokyo (JP); Motohiko Fujimura, Osaka (JP); Kazuhiro Nishikawa, Osaka (JP); Yoshihiro Kawakita, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 318 days.

(21) Appl. No.: 18/503,268

(22) Filed: Nov. 7, 2023

(65) Prior Publication Data

US 2024/0072476 A1 Feb. 29, 2024

Related U.S. Application Data

(63) Continuation of application No. PCT/JP2022/017531, filed on Apr. 11, 2022.

(30) Foreign Application Priority Data

May 17, 2021 (JP) ................................ 2021-083302
Jul. 5, 2021 (JP) ................................ 2021-111701

(51) Int. Cl.
*H01R 13/187* (2006.01)
*H01R 12/71* (2011.01)
*H01R 13/11* (2006.01)

(52) U.S. Cl.
CPC ......... *H01R 13/187* (2013.01); *H01R 12/716* (2013.01); *H01R 13/113* (2013.01)

(58) Field of Classification Search
CPC .... H01R 12/716; H01R 12/52; H01R 13/187; H01R 13/113
See application file for complete search history.

(56) References Cited

U.S. PATENT DOCUMENTS 5,984,692 A 11/1999 Kumagai et al.
6,287,130 B1 9/2001 Torii
(Continued)

FOREIGN PATENT DOCUMENTS

EP 1341264 9/2003
EP 3611804 2/2020
(Continued)

OTHER PUBLICATIONS

International Search Report of PCT application No. PCT/JP2022/017531 dated Jun. 14, 2022.
(Continued)

*Primary Examiner* — Gary F Paumen
(74) *Attorney, Agent, or Firm* — Wenderoth, Lind & Ponack, L.L.P.

(57) ABSTRACT

An electric power converter includes a first board, a second board, and a first board-to-board connector that electrically and mechanically connects the first board and the second board. The first board-to-board connector includes a male fitting member and a female fitting member. Each of a first clamp portion and a second clamp portion of the female fitting member includes a first contact forming portion and a second contact forming portion that are curved in a protruding shape, and a first spring portion and a second spring portion that are connected to the first contact forming portion and the second contact portion, respectively, and that are curved in corrugated shapes. An insert clamped between the first contact forming portion and the second contact forming portion forms an electrical contact, and the first
(Continued)

spring portion and the second spring portion are independently deformable.

14 Claims, 16 Drawing Sheets

(56) References Cited

U.S. PATENT DOCUMENTS

| | | | | |
|---|---|---|---|---|
| 6,814,598 | B2 * | 11/2004 | Hoffmann | H01R 12/718<br>439/852 |
| 7,436,270 | B2 * | 10/2008 | Ratell, Jr. | H05K 3/3436<br>439/74 |
| 8,162,674 | B2 * | 4/2012 | Cho | H01R 12/73<br>362/613 |
| 8,992,233 | B2 * | 3/2015 | Miyazaki | H01R 12/707<br>439/74 |
| 10,923,845 | B2 * | 2/2021 | Mortain | H01R 13/115 |
| 2010/0203752 | A1 | 8/2010 | Urano | |
| 2011/0130023 | A1 | 6/2011 | Kataoka et al. | |
| 2020/0052426 | A1 | 2/2020 | Mortain et al. | |
| 2022/0024513 | A1 | 1/2022 | Fukuda | |

FOREIGN PATENT DOCUMENTS

| | | |
|---|---|---|
| JP | 56-106378 U | 8/1981 |
| JP | 60-026262 B | 6/1985 |
| JP | 64-051272 U | 3/1989 |
| JP | 11-224705 | 8/1999 |
| JP | 2000-014128 | 1/2000 |
| JP | 2000-251989 | 9/2000 |
| JP | 2004-134156 | 4/2004 |
| JP | 2005-149971 | 6/2005 |
| JP | 2006-260958 | 9/2006 |
| JP | 2006-302839 | 11/2006 |
| JP | 2009-242822 | 10/2009 |
| JP | 2010-182644 | 8/2010 |
| JP | 2011-113943 | 6/2011 |
| JP | 2013-254681 | 12/2013 |
| JP | 2014-170626 | 9/2014 |
| JP | 2015-133875 | 7/2015 |
| JP | 2018-049799 | 3/2018 |
| JP | 2018-183055 | 11/2018 |
| JP | 2020-129435 | 8/2020 |
| WO | 2020/137568 | 7/2020 |

OTHER PUBLICATIONS

Extended European Search Report dated Oct. 9, 2024 in European Patent Application No. 22804464.0.

* cited by examiner

ELECTRIC POWER CONVERTING DEVICE, AND BOARD-TO-BOARD CONNECTING PORTION

TECHNICAL FIELD

The present disclosure relates to an electric power converter and a board-to-board connector used in the electric power converter.

BACKGROUND ART

An electric power converter installed onboard an electric automobile or the like includes a plurality of circuit boards each having circuit elements such as a DC/DC converter and an inverter mounted thereon. There has been a demand for reducing the size of the electric power converter, from the viewpoint of the installability on a vehicle, for example.

Conventionally having been known is a technique for stacking a plurality of circuit boards on top of one another to reduce the size of the electric power converter while maintaining the mounting areas of the circuit boards (see, for example, PTL 1). PTL 1 discloses electrically connecting the circuit boards by fitting portions such as connectors provided on the circuit boards.

CITATION LIST

Patent Literature

PTL 1: Unexamined Japanese Patent Publication No. 2000-14128

SUMMARY OF THE INVENTION

An electric power converter according to one aspect of the present disclosure includes:

a first board;

a second board; and a first board-to-board connector interposed between the first board and the second board, the first board-to-board connector electrically and mechanically connecting the first board and the second board, wherein the first board-to-board connector includes:

- a male fitting member including an insert having a substantially flat plate shape, the male fitting member being disposed on one of the first board and the second board; and
- a female fitting member having a first clamp portion and a second clamp portion facing each other, the female fitting member being disposed on another one of the first board and the second board, the first clamp portion includes:

- a first contact forming portion disposed in a tip section of the first clamp portion and curved in a shape protruding toward the second clamp portion;
- a first spring portion disposed in a base section of the first clamp portion, connected to the first contact forming portion, and curved in a shape corrugated toward the second clamp portion, the second clamp portion includes:

- a second contact forming portion disposed in a tip section of the second clamp portion and curved in a shape protruding toward the first clamp portion; and
- a second spring portion disposed in a base section of the second clamp portion, connected to the second contact forming portion, and curved in a shape corrugated toward the first clamp portion, the insert is clamped between the first contact forming portion and the second contact forming portion to form an electrical contact, and the first spring portion and the second spring portion are independently deformable.

An electric power converter according to another aspect of the present disclosure includes:

a first board;

a second board;

a third board;

a first board-to-board connector interposed between the first board and the second board, the first board-to-board connector electrically and mechanically connecting the first board and the second board; and a second board-to-board connector interposed between the second board and the third board, the second board-to-board connector electrically and mechanically connecting the second board and the third board, wherein the first board-to-board connector includes:

- a male fitting member including an insert having a substantially flat plate shape, the male fitting member being disposed on one of the first board and the second board; and
- a female fitting member having a first clamp portion and a second clamp portion facing each other, the female fitting member being disposed on another one of the first board and the second board, the second board-to-board connector includes:

- a male fitting member including an insert having a substantially flat plate shape, the male fitting member being disposed on any one of the second board and the third board; and
- a female fitting member having a first clamp portion and a second clamp portion facing each other, the female fitting member being disposed on another one of the second board and the third board, the first clamp portion includes:

- a first contact forming portion disposed in a tip section of the first clamp portion and curved in a shape protruding toward the second clamp portion; and
- a first spring portion disposed in a base section of the first clamp portion, connected to the first contact forming portion, and curved in a shape corrugated toward the second clamp portion, the second clamp portion includes:

- a second contact forming portion disposed in a tip section of the second clamp portion and curved in a shape protruding toward the first clamp portion;
- a second spring portion disposed in a base section of the second clamp portion, connected to the second contact forming portion, and curved in a shape corrugated toward the first clamp portion, the insert is clamped between the first contact forming portion and the second contact forming portion to form an electrical contact, and the first spring portion and the second spring portion are independently deformable.

A board-to-board connector according to one aspect of the present disclosure is a board-to-board connector interposed between a first board and a second board, and electrically and mechanically connecting the first board and the second board, the board-to-board connector including:

A male fitting member including an insert having a substantially flat plate shape, the male fitting member being disposed on one of the first board and the second board; and a female fitting member having a first clamp portion and a second clamp portion facing each other, the female fitting member being disposed on another one of the first board and the second board, wherein the first clamp portion includes:

a first contact forming portion disposed in a tip section of the first clamp portion and curved in a shape protruding toward the second clamp portion;

a first spring portion disposed in a base section of the first clamp portion, connected to the first contact forming portion, and curved in a shape corrugated toward the second clamp portion, the second clamp portion includes:

a second contact forming portion disposed in a tip section of the second clamp portion and curved in a shape protruding toward the first clamp portion;

a second spring portion disposed in a base section of the second clamp portion, connected to the second contact forming portion, and curved in a shape corrugated toward the first clamp portion, the insert is clamped between the first contact forming portion and the second contact forming portion to form an electrical contact, and the first spring portion and the second spring portion are independently deformable.

DESCRIPTION OF EMBODIMENT

Figure 1:
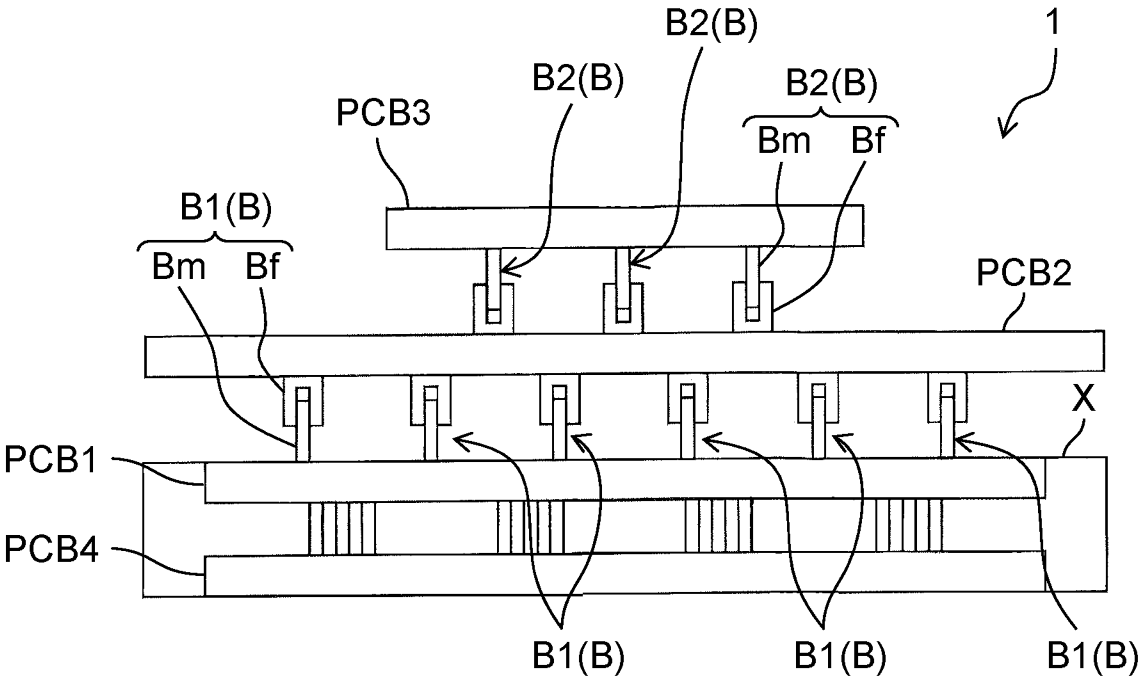
FIG. 1 is a schematic cross-sectional view schematically illustrating an example of a stack structure of a plurality of circuit boards in an electric power converter according to an exemplary embodiment.

Exemplary embodiments explained below provide an electric power converter and a board-to-board connector capable of suppressing a characteristic deterioration of an electrical contact over time, due to factors such as a change in temperature or a vibration.

(1) An electric power converter according to one aspect of the present disclosure includes:

a first board;

a second board; and a first board-to-board connector interposed between the first board and the second board, the first board-to-board connector electrically and mechanically connecting the first board and the second board, wherein the first board-to-board connector includes:

a male fitting member including an insert having a substantially flat plate-like shape, the male fitting member being disposed on one of the first board and the second board; and a female fitting member having a first clamp portion and a second clamp portion facing each other, the female fitting member being disposed on another one of the first board and the second board, the first clamp portion includes:

a first contact forming portion disposed in a tip section of the first clamp portion and curved in a shape protruding toward the second clamp portion;

a first spring portion disposed in a base section of the first clamp portion, connected to the first contact forming portion, and curved in a shape corrugated toward the second clamp portion, the second clamp portion includes:

a second contact forming portion disposed in a tip section of the second clamp portion and curved in a shape protruding toward the first clamp portion; and a second spring portion disposed in a base section of the second clamp portion, connected to the second contact forming portion, and curved in a shape corrugated toward the first clamp portion, the insert is clamped between the first contact forming portion and the second contact forming portion to form an electrical contact, and the first spring portion and the second spring portion are independently deformable.

(2) In the electric power converter according to (1), each of the first contact forming portion and the second contact forming portion may form a convex surface.

(3) In the electric power converter according to (1) or (2), the first clamp portion may include a plurality of first clamp pieces disposed spaced from each other, and the second clamp portion may include a plurality of second clamp pieces disposed spaced from each other, and the first spring portions of the plurality of respective first clamp pieces and the second spring portions of the plurality of respective second clamp pieces may be independently deformable.

(4) In the electric power converter according to (3), the plurality of first clamp pieces may be disposed facing the plurality of second clamp pieces, respectively, in directions facing the insert.

(5) In the electric power converter according to (3), the plurality of first clamp pieces may be disposed at staggered positions with respect to the plurality of respective second clamp pieces, respectively, in directions facing the insert.

(6) In the electric power converter according to any one of (1) to (5), the insert may have a constricted portion recessed in width directions, and a width of the constricted portion may be smaller than a width of larger one of the first clamp portion and the second clamp portion.

(7) In the electric power converter according to any one of (1) to (6), each of the male fitting member and the female fitting member may be formed of a metal material.

(8) In the electric power converter according to (7), the metal material may be copper, a copper alloy including brass, aluminum, or an aluminum alloy.

(9) In the electric power converter according to (7) or (8), conductor plating may be applied to a part or whole of a surface area of the metal material.

(10) In the electric power converter according to (9), the conductor plating may be tin plating, silver plating, or gold plating.

(11) In the electric power converter according to (1) to (10), the electrical contact may have a contact resistance of one milliohm or lower between the insert and the first contact forming portion and the insert and the second contact forming portion.

(12) An electric power converter according to another aspect of the present disclosure includes:

a first board;

a second board;

a third board;

a first board-to-board connector interposed between the first board and the second board, the first board-to-board connector electrically and mechanically connecting the first board and the second board; and a second board-to-board connector interposed between the second board and the third board, the second board-to-board connector electrically and mechanically connecting the second board and the third board, wherein the first board-to-board connector includes:

a male fitting member including an insert having a substantially flat plate-like shape, the male fitting member being disposed on one of the first board and the second board; and a female fitting member having a first clamp portion and a second clamp portion facing each other, the female fitting member being disposed on another one of the first board and the second board, the second board-to-board connector includes:

a male fitting member including an insert having a substantially flat plate-like shape and disposed on any one of the second board and the third board; and a female fitting member having a first clamp portion and a second clamp portion facing each other, the female fitting member being disposed on another one of the second board and the third board, the first clamp portion includes:

a first contact forming portion disposed in a tip section of the first clamp portion and curved in a shape protruding toward the second clamp portion; and a first spring portion disposed in a base section of the first clamp portion, connected to the first contact forming portion, and curved in a shape corrugated toward the second clamp portion, the second clamp portion includes:

a second contact forming portion disposed in a tip section of the second clamp portion and curved in a shape protruding toward the first clamp portion;

a second spring portion disposed in a base section of the second clamp portion, connected to the second contact forming portion, and curved in a shape corrugated toward the first clamp portion, the insert is clamped between the first contact forming portion and the second contact forming portion to form an electrical contact, and the first spring portion and the second spring portion are independently deformable.

(13) In the electric power converter according to (12), the second board may be disposed between the first board and the third board, and the male fitting member or the female fitting member may be disposed on each surface of the second board.

(14) A board-to-board connector according to one aspect of the present disclosure is a board-to-board connector that is interposed between a first board and a second board, and that electrically and mechanically connects the first board and the second board, the board-to-board connector include:

a male fitting member including an insert having a substantially flat plate-like shape, the male fitting member being disposed on one of the first board and the second board; and a female fitting member having a first clamp portion and a second clamp portion facing each other, the female fitting member being disposed on another one of the first board and the second board, wherein the first clamp portion includes:

a first contact forming portion disposed in a tip section of the first clamp portion and curved in a shape protruding toward the second clamp portion;

a first spring portion disposed in a base section of the first clamp portion, connected to the first contact forming portion, and curved in a shape corrugated toward the second clamp portion, the second clamp portion includes:

a second contact forming portion disposed in a tip section of the second clamp portion and curved in a shape protruding toward the first clamp portion;

a second spring portion disposed in a base section of the second clamp portion, connected to the second contact forming portion, and curved in a shape corrugated toward the first clamp portion, the insert is clamped between the first contact forming portion and the second contact forming portion to form an electrical contact, and the first spring portion and the second spring portion are independently deformable.

In electric power converters, fitting members of board-to-board connectors interposed between the circuit board, and connections between such fitting members may become degraded or deform due to factors such as a change in temperature or a vibration, and characteristics of electrical contacts may deteriorate over time.

With the electric power converter and the board-to-board connector according to the present exemplary embodiment, it is possible to suppress such a characteristic deterioration of the electrical contact over time, due to factors such as a change in temperature or a vibration.

Some exemplary embodiments of the electric power converter and the board-to-board connector according to the present disclosure will now be explained with reference to drawings. Note that the present disclosure, however, is not limited to the exemplary embodiments described below.

As an example, electric power converter 1 according to the exemplary embodiment is mounted on an electric automobile, for example, and is provided in an onboard charger that converts AC electric power supplied from an electric power supply (external electric power supply) into DC electric power having a predetermined voltage, and that outputs the resultant DC electric power to a battery such as a lithium ion battery. Such electric power converter 1 includes a plurality of circuit boards having circuit elements such as a DC/DC converter and an inverter mounted thereon.

<Overall Configuration of Electric Power Converter 1>

FIG. 1 is a cross-sectional view schematically illustrating one example of a stack structure of the circuit boards in electric power converter 1 according to an exemplary embodiment. FIG. 1 illustrates first board PCB1, second board PCB2, and third board PCB3, among a plurality of circuit boards provided to electric power converter 1.

As illustrated in FIG. 1, electric power converter 1 includes first board PCB1, second board PCB2, and third board PCB3, and board-to-board connectors B are interposed between these boards. Hereinafter, board-to-board connectors B interposed between first board PCB1 and second board PCB2 will be referred to as "first board-to-board connectors B1", and board-to-board connectors B interposed between second board PCB2 and third board PCB3 will be referred to as "second board-to-board connectors B2".

Each of first board PCB1, second board PCB2, and third board PCB3 is a printed circuit board (PCB). As the printed circuit board, for example, it is possible to use a so-called glass epoxy board in which a copper wiring pattern is formed on a glass epoxy insulating base material, or a highly heat-dissipating metal composite board in which an insulating layer is provided on a copper or an aluminum plate and that has a copper wiring pattern formed thereon. A part of the metal on the printed circuit board may be heat-exchangeably brought into contact with a frame that is being water-cooled. With such a configuration, a temperature rise of the electronic component mounted on the printed circuit board can be suppressed. With a printed circuit board using a metal as a base material, cooling efficiency is improved, as compared with a printed circuit board using resin as a base material.

Note that only some of the plurality of circuit boards included in electric power converter 1 may be printed circuit boards. For example, at least one of first board PCB1, second board PCB2, and third board PCB3 may be a printed circuit board.

First board PCB1 and second board PCB2 are electrically and mechanically connected to each other by a plurality of first board-to-board connectors B1 interposed therebetween. For example, twenty four first board-to-board connectors B1 are provided.

Second board PCB2 and third board PCB3 are also electrically and mechanically connected to each other by a plurality of second board-to-board connectors B2 interposed therebetween. For example, six second board-to-board connectors B2 are provided.

Each of first board-to-board connectors B1 and second board-to-board connectors B2 includes male fitting member Bm and female fitting member Bf. Each of male fitting members Bm is a blade-shaped connector to be inserted, and is referred to as a plug. Male fitting member Bm may also be referred to as a flat plug blade. Female fitting member Bf is an accepting-side connector, and is referred to as a receptacle. Female fitting member Bf may also be referred to as a blade receiving spring.

As an example, a plurality of male fitting members Bm are disposed on a principal surface of first board PCB1, the principal surface facing second board PCB2. A plurality of female fitting members Bf are disposed on both principal surfaces of second board PCB2. A plurality of male fitting members Bm are disposed on a principal surface of third board PCB3, the principal surface facing second board PCB2.

First board PCB1 outputs electric power corresponding to the electric power supplied from second board PCB2 to a battery or the like, via first board-to-board connectors B1, for example. First board PCB1 is electrically connected to fourth board PCB4, and makes up board unit X together with fourth board PCB4. Fourth board PCB4 is a printed circuit board similar to first board PCB1, for example.

First board PCB1 may be connected to a transformer unit via a plurality of (e.g., twelve) board-to-board connectors B. In board unit X, first board PCB1 may also be connected to fourth board PCB4 by a plurality of board-to-board connectors B. In other words, the structure of board-to-board connector B disclosed in the exemplary embodiment may be used in connecting boards within a unit such as board unit X, in connecting board units, or in connecting a board unit and a board outside the board unit.

Second board PCB2 outputs electric power corresponding to the electric power supplied from third board PCB3 to first board PCB1 via first board-to-board connectors B1 and second board-to-board connectors B2.

Third board PCB3 outputs electric power corresponding to the electric power supplied from, for example, the external electric power supply to second board PCB2, via second board-to-board connectors B2.

When a plurality of circuit boards included in electric power converter 1 has a stack structure including three or more layers, as in the present exemplary embodiment, the board at an intermediate layer (in the example herein, second board PCB2) has a principal surface provided with male fitting members Bm, and another principal surface provided with female fitting members Bf.

Male fitting members Bm and female fitting members Bf are made of a metal material. As an example, male fitting members Bm and female fitting members Bf are made of copper, a copper alloy including brass, aluminum, or an aluminum alloy. In addition, conductor plating is applied to a part or whole of the surface area of each male fitting member Bm or female fitting member Bf. As the conductor plating, for example, tin plating, silver plating, or gold plating may be used, as appropriate.

Tin has a property easily alloyable with nickel that is used as a base of male fitting member Bm and female fitting member Bf. When the ambient temperature becomes high, tin alloys with nickel and become oxidized, and comes to have a resistance of 1 [mΩ] or higher. By contrast, silver and gold are less alloyable with nickel and become oxidized less. Therefore, silver or gold plating is advantageous in ensuring the quality of electrical contact P.

In addition, if there is a high contact resistance between male fitting member Bm and female fitting member Bf, a temperature may rise and oxidation may take place on the interface on electrical contact P, and the characteristics of electrical contact P may deteriorate. Therefore, in the present exemplary embodiment, the contact resistance of the contact portion between male fitting member Bm and female fitting member Bf is adjusted to 1 [mΩ] or lower. Specifically, in board-to-board connector B, the contact resistance between insert 11 of male fitting member Bm and ridge portions of first and second clamp portion 21 and 22 of female fitting member Bf is adjusted to 1 [mΩ] or lower.

By setting the contact resistance in board-to-board connector B of electric power converter 1 low, it is possible to suppress heat generation and an electric power loss in board-to-board connector B, and to improve the degree of freedom in the shape and the material of female fitting member Bf, for example.

The contact resistance between male fitting member Bm and female fitting members Bf is defined by the "contact pressure", the "material (e.g., tin plating of the surface)", and the "contact area". In the present exemplary embodiment, as an example, the contact resistance is adjusted to 1 [mΩ] or lower by adjusting the elasticities of first clamp portion 21 and second clamp portion 22 of female fitting member Bf, that is, the contact pressure between first clamp portion 21 and second clamp portion 22. In other words, the elasticity of (contact pressure between) first clamp portion 21 and second clamp portion 22 of female fitting member Bf is designed so as to achieve a contact resistance of 1 [mΩ] or lower. Note that the elasticity of first clamp portion 21 and second clamp portion 22 depend on factors such as the material (base material) and the shape (e.g., its thickness and the width of elastic portion) of female fitting member Bf.

<Male Fitting Member Bm>

Figures 2A, 2B, 2C, 2D, 2E:
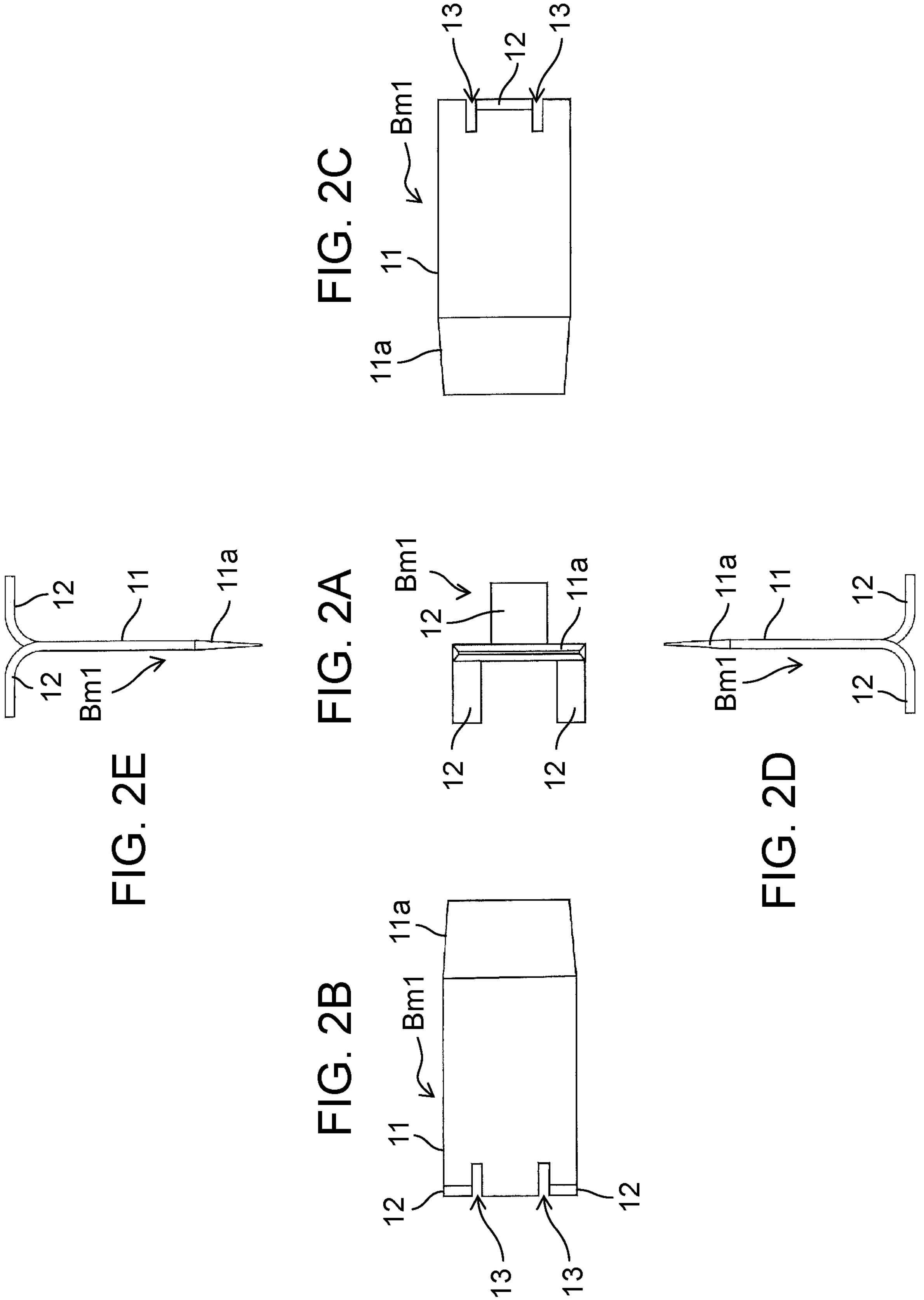
FIG. 2A is a schematic development view illustrating a schematic configuration of one example of a male fitting member.
FIG. 2B is a schematic development view illustrating a schematic configuration of the one example of the male fitting member.
FIG. 2C is a schematic development view illustrating a schematic configuration of the one example of the male fitting member.
FIG. 2D is a schematic development view illustrating a schematic configuration of the one example of the male fitting member.
FIG. 2E is a schematic development view illustrating a schematic configuration of the one example of the male fitting member.

FIGS. 2A to 2E are schematic development views illustrating a schematic configuration of male fitting member Bm1 that is an example of male fitting member Bm illustrated in FIG. 1. FIG. 2A is a plan view of male fitting member Bm1 as viewed from the tip side of insert 11. FIG. 2B is a left side view, FIG. 2C is a right side view, FIG. 2D is a front view, and FIG. 2E is a rear view of male fitting member Bm1.

As illustrated in FIGS. 2A to 2E, male fitting member Bm1 includes insert 11 and board-connected portion 12. Male fitting member Bm1 is formed by cutting and bending a single metal plate, for example.

Insert 11 is a portion that is fitted into female fitting member Bf to form electrical contact P, and has a substantially flat plate-like shape. Tip portion 11*a* of insert 11 is chamfered, and the thickness thereof becomes smaller toward the tip. With this, insert 11 can be easily inserted into female fitting member Bf.

Board-connected portion 12 is a portion connected to a printed circuit board (e.g., first board PCB1), and is provided to the base end of insert 11. Board-connected portion 12 is soldered to a predetermined position of the printed circuit board, to electrically connect insert 11 and a wiring on the printed circuit board. Board-connected portions 12 are formed by bending the portions spaced by slits 13 in the alternating directions, substantially perpendicularly to insert 11, for example.

The number of the board-connected portions 12 (the number of portions into which the base end of insert 11 is divided) may be changed to any number equal to or more than two. When insert 11 is longer, for example, it is preferable to provide a larger number of board-connected portions 12. Although it is assumed that board-connected portion 12 illustrated in FIGS. 2A to 2E is mounted on a surface of the printed circuit board by soldering, board-connected portion 12 may also be bonded to the printed circuit board using a technique other than the surface mounting. For example, board-connected portion 12 may be inserted into the printed circuit board and bonded to the printed circuit board by flow soldering.

Figures 3A, 3B, 3C, 3D, 3E:
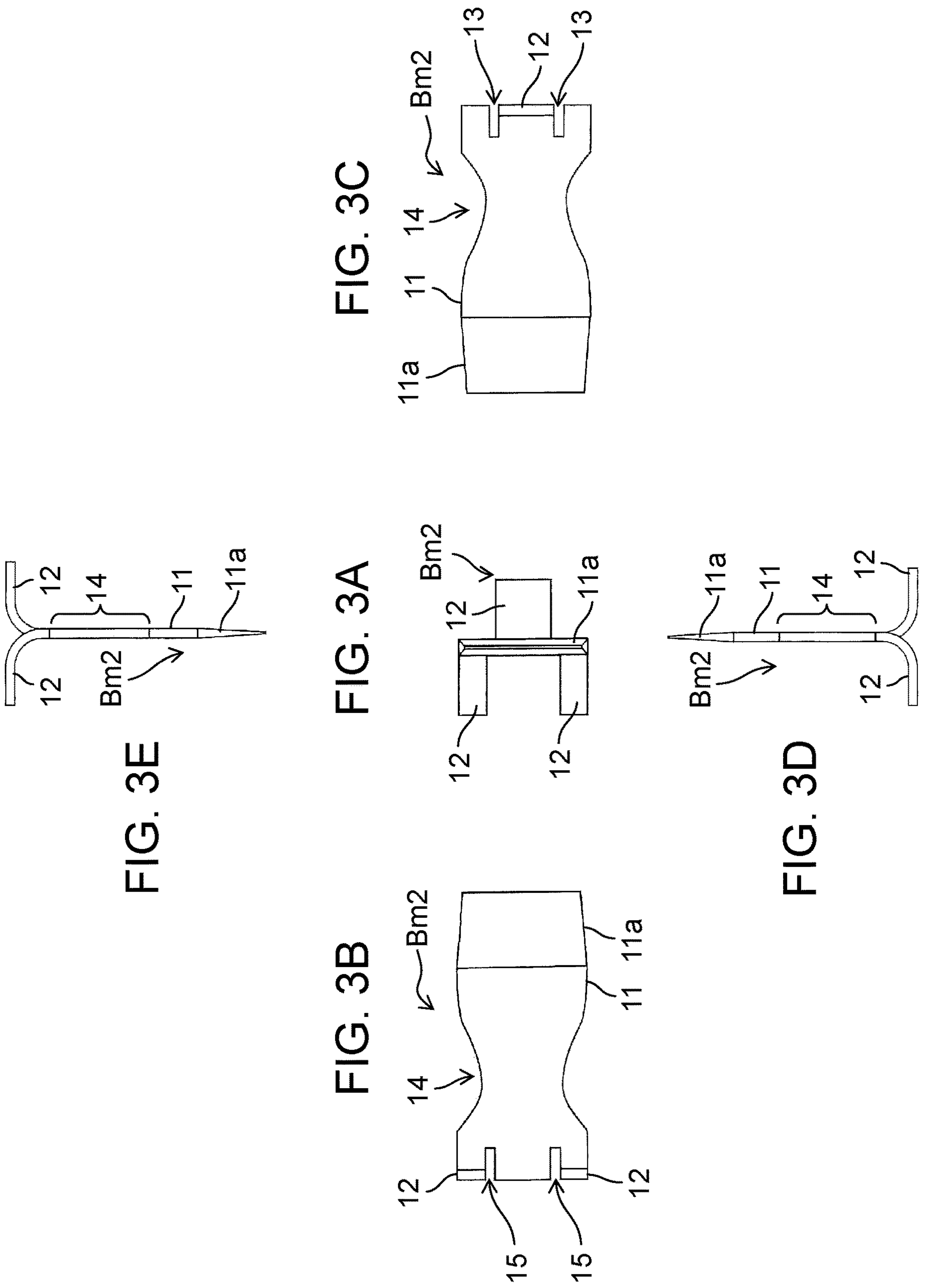
FIG. 3A is a schematic development view illustrating a schematic configuration of another example of the male fitting member.
FIG. 3B is a schematic development view illustrating a schematic configuration of the other example of the male fitting member.
FIG. 3C is a schematic development view illustrating a schematic configuration of the other example of the male fitting member.
FIG. 3D is a schematic development view illustrating a schematic configuration of the other example of the male fitting member.
FIG. 3E is a schematic development view illustrating a schematic configuration of the other example of the male fitting member.

FIGS. 3A to 3E are schematic development views illustrating a schematic configuration of male fitting member Bm2 that is another example of male fitting member Bm illustrated in FIG. 1. FIG. 3A is a plan view of male fitting member Bm2 as viewed from the tip side of insert 11. FIG. 3B is a left side view, FIG. 3C is a right side view, FIG. 3D is a front view, and FIG. 3E is a rear view of male fitting member Bm.

Male fitting member Bm2 illustrated in FIGS. 3A to 3E is different from male fitting member Bm1 illustrated in the drawings such as FIG. 2A, in that constricted portion 14 is provided to insert 11. Constricted portion 14 is, for example, recessed in a curved shape in the width directions, and is symmetrical in the longitudinal direction. Constricted portion 14 is formed by, for example, cutting a metal plate material. Width W1 (see FIG. 7A) of the narrowest portion of constricted portion 14 may be any size smaller than width W2 (see FIG. 7A) of tip portion 11*a*, and the Shape of the Constricted Portion 6 is not limited to that illustrated in the drawings such as FIG. 3B, for example.

<Female Fitting Member Bf>

Figures 4A, 4B, 4C, 4D, 4E:
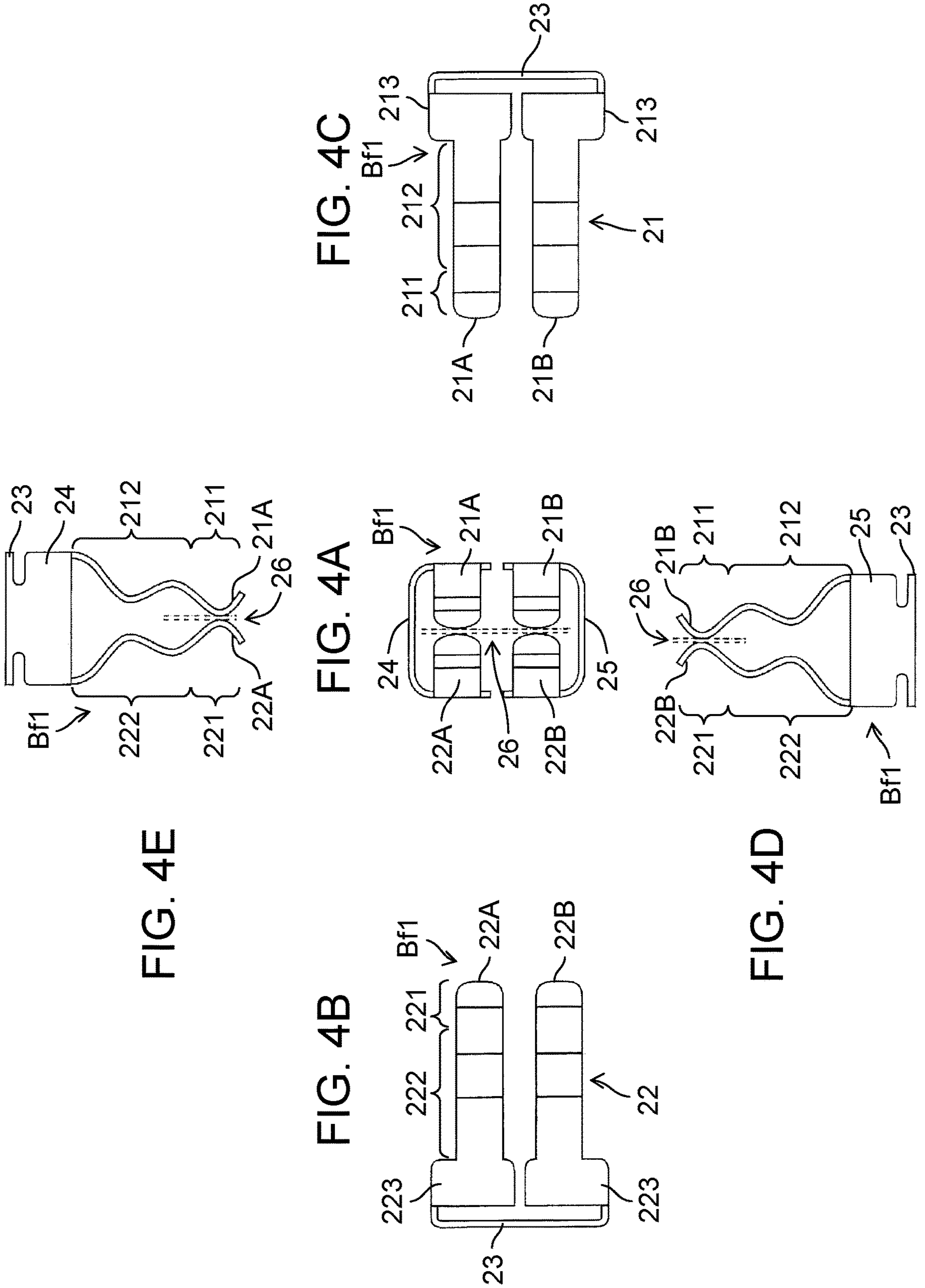
FIG. 4A is a schematic development view illustrating a schematic configuration of one example of a female fitting member.
FIG. 4B is a schematic development view illustrating a schematic configuration of the one example of the female fitting member.
FIG. 4C is a schematic development view illustrating a schematic configuration of the one example of the female fitting member.
FIG. 4D is a schematic development view illustrating a schematic configuration of the one example of the female fitting member.
FIG. 4E is a schematic development view illustrating a schematic configuration of the one example of the female fitting member.

FIGS. 4A to 4E are schematic development views illustrating a schematic configuration of female fitting member Bf1 that is an example of female fitting member Bf illustrated in FIG. 1. FIG. 4A is a plan view of female fitting member Bf1 as viewed from the tip side of clamp portion 21 and clamp portion 22. FIG. 4B is a left side view, FIG. 4C is a right side view, FIG. 4D is a front view, and FIG. 4E is a rear view of female fitting member Bf1.

As illustrated in FIGS. 4A to 4E, female fitting member Bf1 includes first clamp portion 21, second clamp portion 22, board-connected portion 23, and joints 24 and 25. Female fitting member Bf1 is formed by, for example, cutting and bending of one metal plate.

Board-connected portion 23 is a portion connected to a printed circuit board (e.g., second board PCB2), and has a substantially rectangular shape in a plan view. Board-connected portion 23 is bonded to a predetermined position of the printed circuit board with soldering, to electrically connect first clamp portion 21 and second clamp portion 22 to a wiring on the printed circuit board.

Joints 24 and 25 are portions that join first clamp portion 21 and second clamp portion 22 to board-connected portion 23. Joints 24 and 25 are bent substantially perpendicularly to board-connected portion 23.

First clamp portion 21 has two first clamp pieces 21A and 21B that are disposed side by side with a predetermined space therebetween. Second clamp portion 22 has two clamp pieces 22A and 22B that are disposed side by side with a predetermined space therebetween. In addition, first clamp portion 21 and second clamp portion 22, as a whole, are disposed facing each other with a predetermined space therebetween.

Specifically, first clamp piece 21A and second clamp piece 22A are disposed facing each other, as bent parts of base portion 213 and base portion 223, respectively, being bent substantially perpendicularly to joint 24. First clamp piece 21A and second clamp piece 22A are spaced with respect to each other from the tip to the base end thereof, and spacing width therebetween becomes smaller toward the tip.

Similarly, first clamp piece 21B and second clamp piece 22B are disposed facing each other, as bent parts of base portion 213 and base portion 223, respectively, being bent substantially perpendicularly to joint 25. First clamp piece 21B and second clamp piece 22B are spaced with respect to each other from the tip to the base end thereof, and spacing width therebetween becomes smaller toward the tip.

Receiving portion 26 is formed as a space between the tips of first clamp portion 21 and second clamp portion 22. Insert 11 of male fitting member Bm is inserted into receiving portion 26. First clamp portion 21 and second clamp portion 22 function as leaf springs, with insert 11 of male fitting member Bm inserted therebetween, and press and clamp insert 11.

In each of first clamp piece 21A and first clamp piece 21B, first clamp portion 21 includes first contact forming portion 211 that is disposed in a tip section of the first clamp portion 21, and first spring portion 212 that is disposed in a base section of first clamp portion 21 and connected to first contact forming portion 211. In each of second clamp piece 22A and second clamp piece 22B, second clamp portion 22 includes second contact forming portion 221 that is disposed in a tip section of the second clamp portion 22, and second spring portion 222 that is disposed in a base section of the second clamp portion 22 and connected to second contact forming portion 221.

First contact forming portion 211 is curved in a shape protruding toward second clamp portion 22. Second contact forming portion 221 is curved in a shape protruding toward first clamp portion 21 (see FIGS. 4D, 4E). The curved part of first contact forming portion 211 and the curved part of second contact forming portion 221 are positioned nearest each other, and spacing width R by which the curved parts are spaced from each other is set larger than the thickness of tip portion 11*a* of insert 11 of male fitting member Bm and smaller than the plate thickness of insert 11. The curved parts of first contact forming portion 211 and second contact forming portion 221 are brought into contact with insert 11 of male fitting member Bm, and forms electrical contact P with insert 11.

The shape in which the curved part of each of first contact forming portion 211 and second contact forming portion 221 protrude preferably delineates a convex surface. In this manner, the resistance in inserting insert 11 of male fitting member Bm is reduced, so that male fitting member Bm can be easily fitted into female fitting member Bf.

Note that the curved surface of each of first contact forming portion 211 and second contact forming portion 221 may be in any shape as long as electrical contact P can be formed with insert 11 of the male fitting member Bm, by being firmly brought into contact therewith. For example, each of first contact forming portions 211 and second contact forming portions 221 may have a V shape or U shape formed by bending a metal plate into a smooth curve, or may be provided as a hemispherical protrusion provided to a facing surface of each of first contact forming portion 211 and second contact forming portion 221. Furthermore, the hemispherical protrusion may be provided in plurality on each of first contact forming portion 211 and second contact forming portion 221.

First spring portion 212 is curved toward second clamp portion 22 in a corrugated shape. Specifically, first spring portion 212 includes a recessed portion and a protruding portion that is connected to the recessed portion. Second spring portion 222 is curved toward first clamp portion 21 in a corrugated shape. Specifically, second spring portion 222 includes a recessed portion and a protruding portion that is connected to the recessed portion.

Note that the shapes of first spring portion 212 and second spring portion 222 are not limited to a particular shape, as long as these springs can absorb relative vertical movements that may be caused by factors such as a change in temperature or a vibration.

Female fitting member Bf1 includes first clamp pieces 21A and 21B in the number equal to the number of second clamp pieces 22A and 22B, and first clamp pieces 21A and 21B are arranged facing second clamp pieces 22A and 22B, respectively, in the direction facing insert 11.

Rotational or vertical movements of electrical contact P caused by a change in temperature, a vibration, or the like can take place in any direction, but the structure described above can absorb such rotational and vertical movements.

The numbers of first clamp pieces 21A and 21B, and second clamp pieces 22A and 22B are not limited to those illustrated in the drawings such as FIG. 4A, and three or more clamp pieces may be provided on one side, for example.

In female fitting member Bf1, first clamp portion 21 and second clamp portion 22 are disposed spaced from each other. In addition, first clamp piece 21A and first clamp piece 21B of first clamp portion 21 are also disposed spaced from each other, and second clamp piece 22A and second clamp piece 22B of second clamp portion 22 are also disposed spaced from each other. In other words, two first spring portions 212 and two second spring portions 222 are independently deformable as insert 11 is brought into contact therewith. Therefore, it is possible to absorb the rotational and the vertical movements with respect to electrical contact P, efficiently. In other words, the contact of electrical contact P is maintained because first spring portion 212 or the second spring portion 222 deforms following the rotation or the vertical movement with respect to electrical contact P.

Figures 5A, 5B, 5C, 5D, 5E:
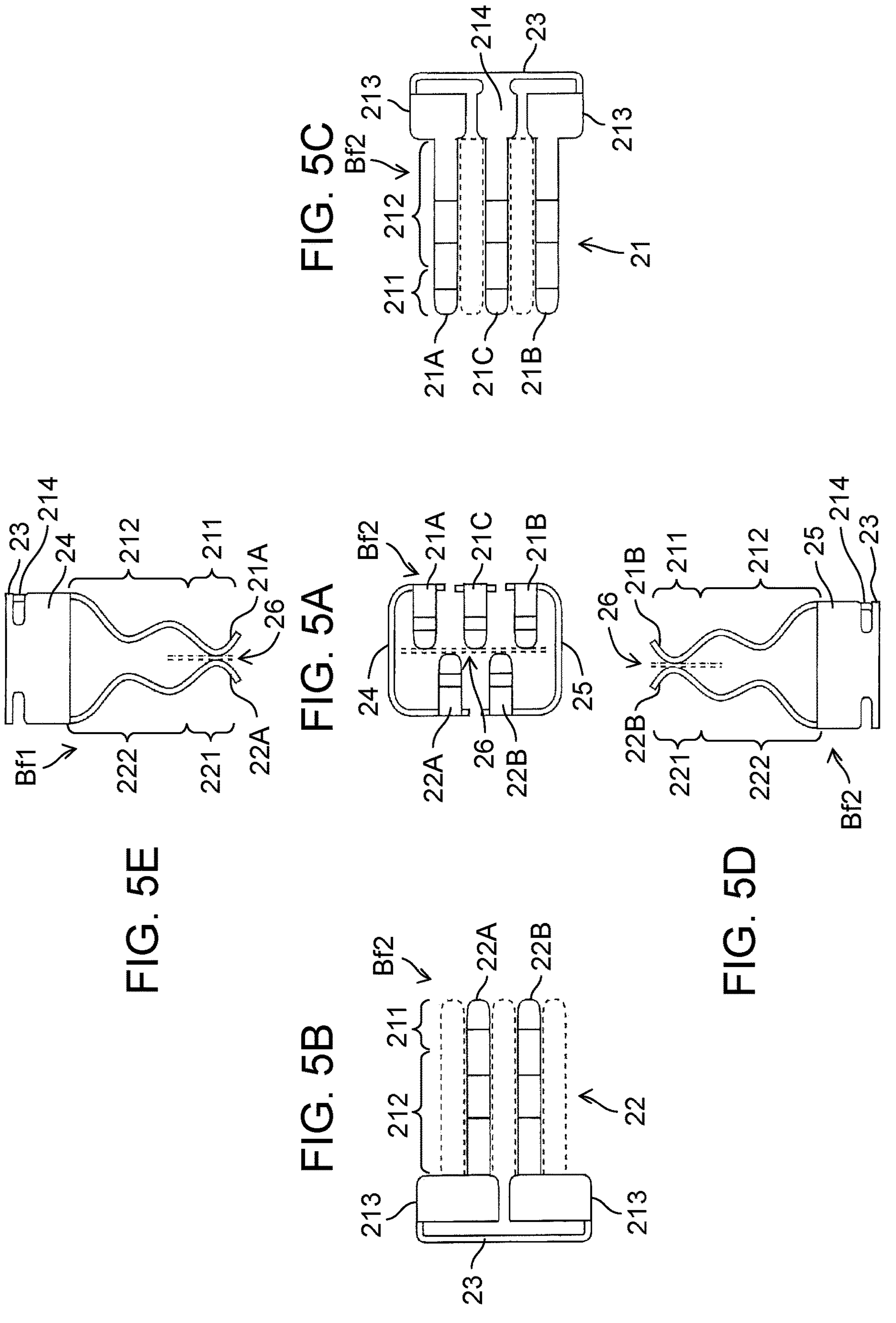
FIG. 5A is a schematic development view illustrating a schematic configuration of another example of the female fitting member.
FIG. 5B is a schematic development view illustrating a schematic configuration of the other example of the female fitting member.
FIG. 5C is a schematic development view illustrating a schematic configuration of the other example of the female fitting member.
FIG. 5D is a schematic development view illustrating a schematic configuration of the other example of the female fitting member.
FIG. 5E is a schematic development view illustrating a schematic configuration of the other example of the female fitting member.

FIGS. 5A to 5E are schematic development views illustrating a schematic configuration of female fitting member Bf2 that is an example of female fitting member Bf illustrated in FIG. 1. FIG. 5A is a plan view of female fitting member Bf2 as viewed from the tip side of clamp portion 21 and clamp portion 22, FIG. 5B is a left side view, FIG. 5C is a right side view, FIG. 5D is a front view, and FIG. 5E is a rear view of female fitting member Bf2.

Female fitting member Bf2 illustrated in FIGS. 5A to 5E is different from female fitting member Bf1 illustrated in FIGS. 4A to 4E in that the clamp pieces included in first clamp portion 21 and second clamp portion 22 are in a different positional relationship.

Specifically, first clamp portion 21 includes three first clamp pieces 21A to 21C, and second clamp portion 22 includes two second clamp pieces 22A and 22B. For example, by the base portions 214 are bent substantially perpendicularly to board-connected portion 23, the first clamp piece 21C is disposed between first clamp piece 21A and first clamp piece 21B. First clamp pieces 21A to 21C and second clamp pieces 22A and 22B are disposed at staggered positions in directions facing each other. First clamp portion 21 faces second clamp portion 22 in the first direction. First clamp portion 21 includes first clamp pieces 21A to 21C that are arranged in a second direction orthogonal to the first direction. Second clamp portion 22 includes second clamp pieces 22A and 22B arranged in the second direction. Second clamp piece 22A and second clamp piece 22B are offsets from first clamp pieces 21A to 21C in the second direction. For example, second clamp piece 22A is positioned between first clamp piece 21A and the first clamp piece 21C in the second direction. Second clamp piece 22B is positioned between the first clamp piece 21C and the first clamp piece 21B in the second direction. As a result, insert 11 of male fitting member Bm is firmly held thereby, so that extremely stable fitting connection is achieved.

<Coupling Structure of Male Fitting Member Bm and Female Fitting Member Bf (Structure of Board-to-Board Connector B)>

Figure 6C:
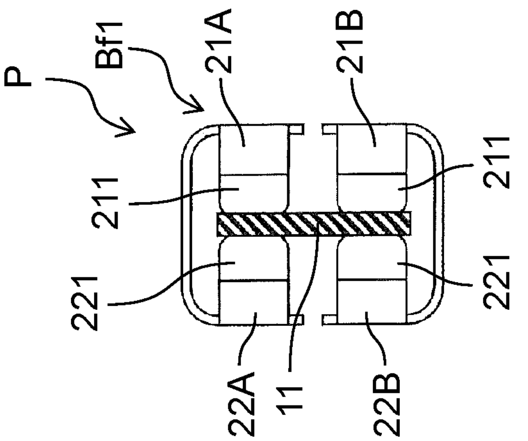
FIG. 6C is a schematic diagram illustrating the one example of the coupling structure of the board-to-board connector.
Figure 6B:
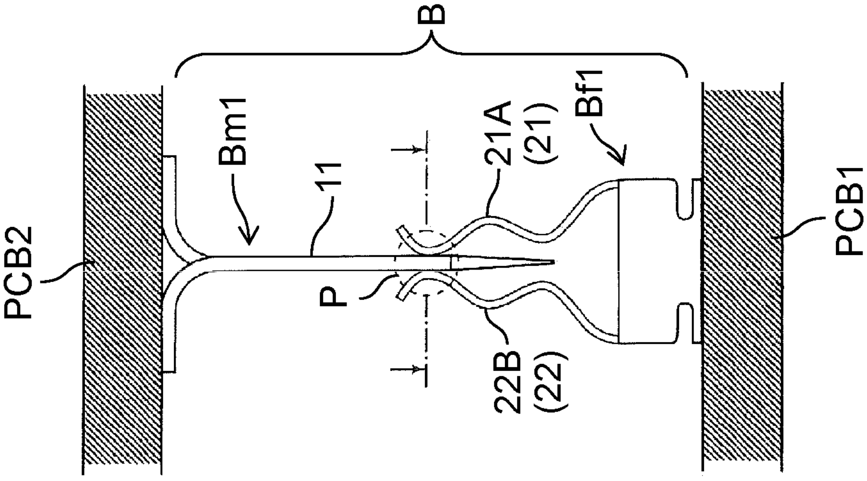
FIG. 6B is a schematic diagram illustrating the one example of the coupling structure of the board-to-board connector.
Figure 6A:
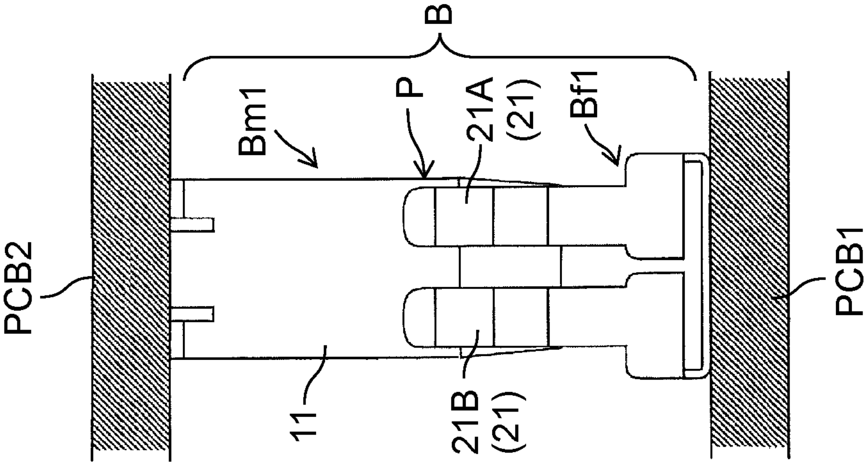
FIG. 6A is a schematic diagram illustrating one example of a coupling structure of a board-to-board connector.

FIGS. 6A to 6C are schematic diagrams illustrating an example of a coupling structure of board-to-board connector B. FIGS. 6A to 6C illustrate board-to-board connector B in which male fitting member Bm1 illustrated in drawings such as FIG. 2A is coupled to female fitting member Bf1 illustrated in the drawings such as FIG. 4A.

FIG. 6A and FIG. 6B are is a right side view and a front view of board-to-board connector B, respectively, and FIG. 6C is a schematic cross-sectional view of electrical contact P as viewed in the direction indicated by the arrows in FIG. 6B.

As illustrated in FIGS. 6A and 6B, female fitting member Bf1 is implemented on first board PCB1, and male fitting member Bm1 is implemented on second board PCB2. Insert 11 of male fitting member Bm1 is clamped between first clamp portion 21 and second clamp portion 22 of female fitting member Bf1, to electrically connect first board PCB1 and second board PCB2.

As illustrated in FIG. 6C, among electrical contacts P between male fitting member Bm1 and female fitting member Bf1, electrical contact P1 formed by first clamp portion 21 is disposed in a manner facing electrical contact P2 formed by second clamp portion 22, with insert 11 interposed therebetween. In addition, the surfaces of first contact forming portion 211 and second contact forming portion 221 of female fitting member Bf1 are in contact with and are connected to the surface of insert 11 of male fitting member Bm1. Because the surfaces of first contact forming portion 211 and second contact forming portion 221 have protrusions protruding toward insert 11, first contact forming portion 211 and second contact forming portion 221 press the surfaces of insert 11, and are firmly brought into contact with the surfaces of insert 11. In board-to-board connector B, for example, the contact pressure between male fitting member Bm1 and female fitting member Bf1 is higher than that of a conventional coupling structure having male fitting member with a pin-shaped insert. Therefore, it is possible to reduce the contact resistance at electrical contact P.

In addition, first spring portion 212 of the first clamp portion 10 and second spring portion 222 of second clamp portion 11 deform independently following the movements such as a vibration that takes place around electrical contact P. Therefore, first spring portion 212 and second spring portion 222 can absorb the vertical movements associated with a vibration or the like, so that an extremely stable electrical contact P can be achieved.

Figure 7B:
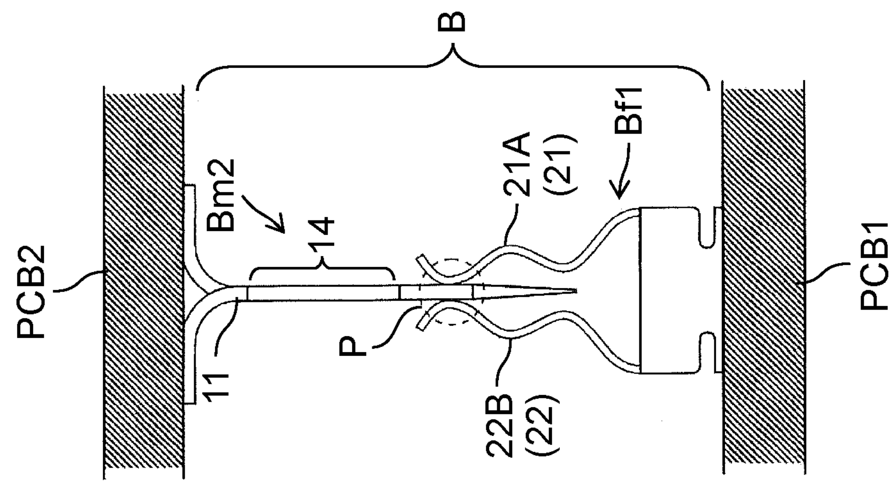
FIG. 7B is a schematic diagram illustrating the other example of the coupling structure of the board-to-board connector.
Figure 7A:
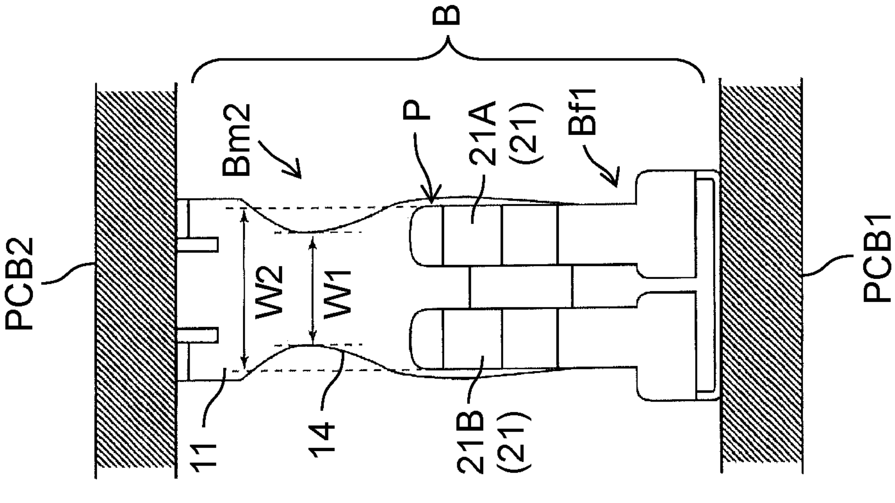
FIG. 7A is a schematic diagram illustrating another example of the coupling structure of the board-to-board connector.

FIGS. 7A and 7B are schematic diagrams illustrating another example of the coupling structure of board-to-board connector B. FIGS. 7A and 7B illustrate board-to-board connector B in which male fitting member Bm2 illustrated in the drawings such as FIG. 3A is coupled to female fitting member Bf1 illustrated in the drawings such as FIG. 4A. FIGS. 7A and 7B are a right side view and a front view of board-to-board connector B, respectively.

In board-to-board connector B illustrated in FIGS. 7A and 7B, insert 11 of male fitting member Bm2 has constricted portion 14. The elements other than constricted portion 14 are the same as those in the board-to-board connection structure illustrated in FIGS. 6A to 6C. Electrical contact P formed by male fitting member Bm2 and female fitting member Bf1 is also completely the same as that illustrated in FIG. 6C, and therefore, not illustrated.

As illustrated in FIG. 7A, when insert 11 of male fitting member Bm2 has constricted portion 14, smallest width W1 of constricted portion 14 is set smaller than width W2 of first clamp portion 21 of female fitting member Bf1.

In electrical contact P, when movements such as vibrations take place in the rotational direction about a rotation axis extending along a direction in which board-to-board connector B extends (vertical direction), the amount of rotation is reduced by the twisting movement of constricted portion 14. Therefore, board-to-board connector B illustrated in FIGS. 7A and 7B can absorb the vibrations in the rotating directions generated around electrical contact P, efficiently, in addition to the vertical vibration absorbing effect achieved by the spring structure illustrated in FIGS. 6A to 6C. Hence, it is possible to achieve extremely stable electrical contact P.

Figure 8C:
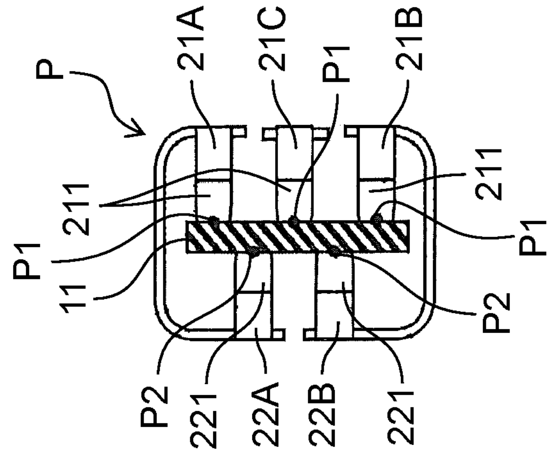
FIG. 8C is a schematic diagram illustrating the other example of the coupling structure of the board-to-board connector.
Figure 8B:
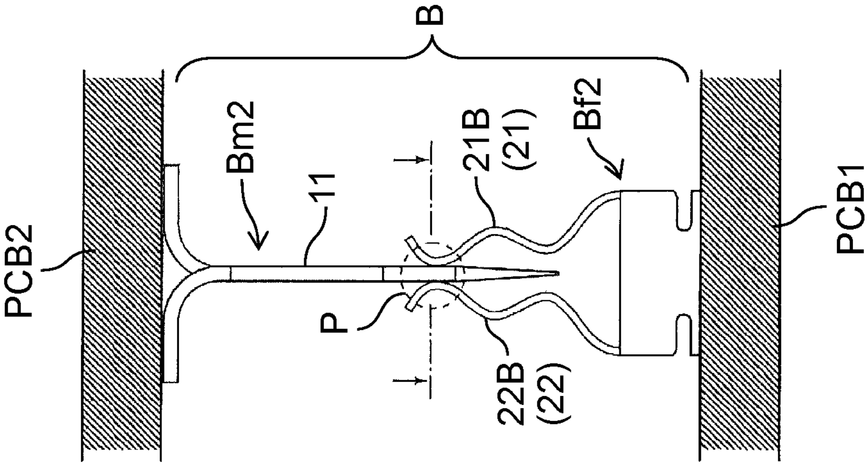
FIG. 8B is a schematic diagram illustrating the other example of the coupling structure of the board-to-board connector.
Figure 8A:
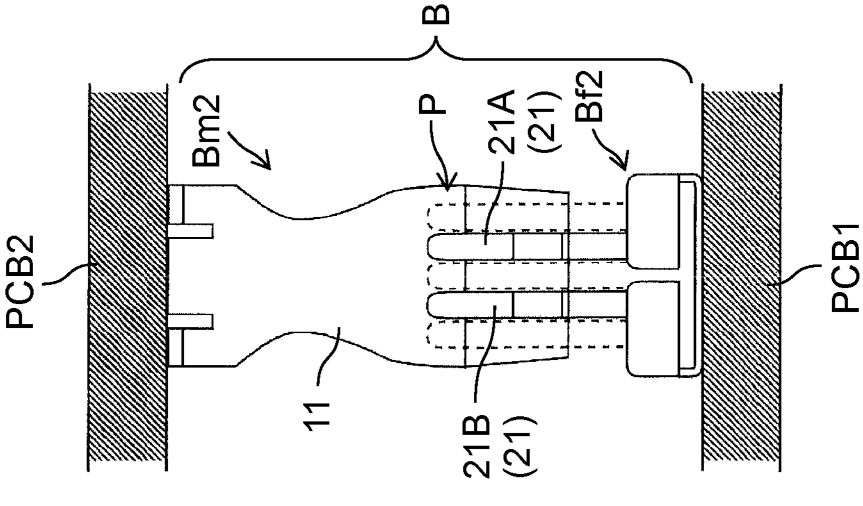
FIG. 8A is a schematic diagram illustrating the other example of the coupling structure of the board-to-board connector.

FIGS. 8A to 8C are schematic diagrams illustrating another example of the coupling structure of board-to-board connector B. FIGS. 8A to 8C illustrate board-to-board connector B in which male fitting member Bm2 illustrated in drawings such as FIG. 3A is connected to female fitting member Bf2 illustrated in the drawings such as FIG. 5A. FIGS. 8A and 8B are a right side view and a front view of board-to-board connector B, respectively, and FIG. 8C is a schematic cross-sectional view of electrical contact P viewed in the direction indicated by the arrows in FIG. 8B.

As illustrated in FIG. 8C, in electrical contact P formed between female fitting member Bf2 and male fitting member Bm2, electrical contacts P1 formed with first clamp portions 21 and electrical contacts P2 formed with second clamp portions 22 are disposed at staggered positions. In other words, center lines C1 to C3 of respective first clamp pieces 21A to 21C do not overlap with center lines C4 and C5 of respective second clamp pieces 22A and 22B. In other words, second clamp piece 22A faces a space between first clamp pieces 21A and 21C, and second clamp piece 22B faces a space between first clamp pieces 21B and 21C, with insert 11 therebetween.

Due to such a positional relationship, electrical contacts P1 and P2 do not receive the reactive force of the contact pressure. In addition, the surface of insert 2 is pressed by the protruding shapes of first contact forming portions 211 each of which forms electrical contact P1, and by the protruding shapes of second contact forming portions 212 each of which forms electrical contact P2.

With this, because the contact pressure between male fitting member Bm2 and female fitting member Bf2 is increased in board-to-board connector B, the contact resistance at electrical contacts P can be reduce greatly. Furthermore, because insert 11 is firmly coupled with first clamp portions 21 and second clamp portions 22 at respective electrical contacts P, electrical contacts P are less likely to be affected by the movements caused by vibrations or a change in temperature around electrical contacts P.

Figure 9A:
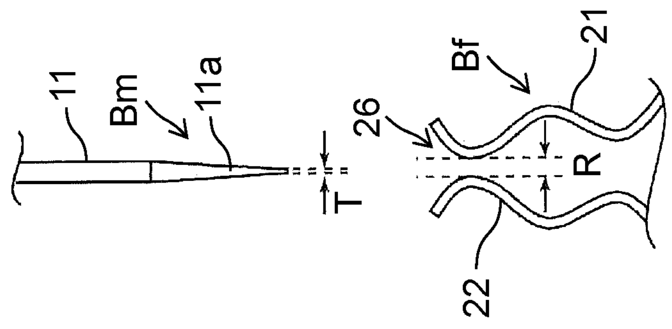
FIG. 9A is a view illustrating a process of coupling a male fitting member and a female fitting member.
Figure 9B:
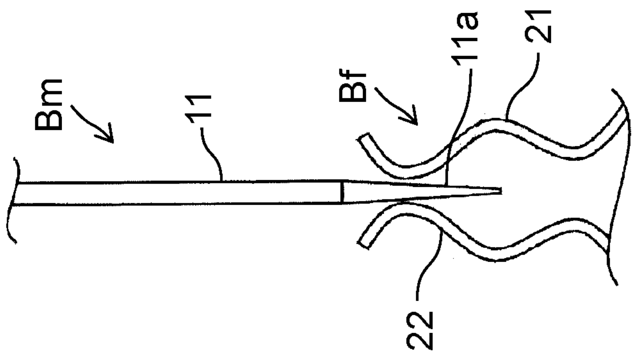
FIG. 9B is a view illustrating the process of coupling the male fitting member and the female fitting member.
Figure 9C:
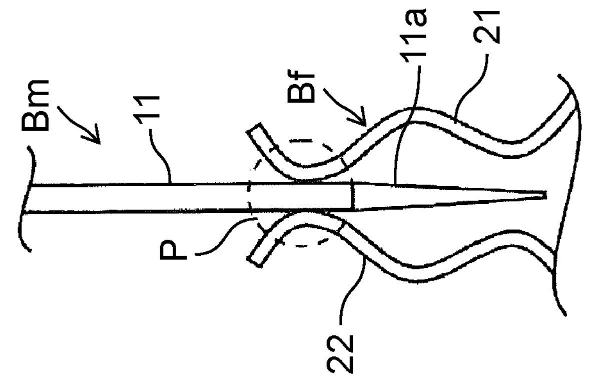
FIG. 9C is a view illustrating the process of coupling the male fitting member and the female fitting member.

FIGS. 9A to 9C are views illustrating a process of coupling male fitting member Bm and female fitting member Bf. FIG. 9A illustrates positioning immediately before male fitting member Bm is fitted into female fitting member Bf. FIG. 9B illustrates positioning with tip portion 11*a* of male fitting member Bm inserted into receiving portion 26 of female fitting member Bf. FIG. 9C illustrates positioning with male fitting member Bm completely fitted into female fitting member Bf and forming electrical contact P.

As illustrated in FIG. 9A, tip thickness T of tip portion 11*a* of male fitting member Bm is set smaller than spacing width R of receiving portion 26 of female fitting member Bf. When male fitting member Bm is further inserted, as illustrated in FIG. 9B, tip portion 11*a* of insert 11 is brought into contact with first clamp portion 21 and second clamp portion 22. When male fitting member Bm is inserted further, insert 11 is brought into contact with first clamp portion 21 and second clamp portion 22, and is inserted to widen the space between first clamp portion 21 and second clamp portion 22, and reaches the position illustrated in FIG. 9C. At the position illustrated in FIG. 9C, insert 11 of male fitting member Bm forms electrical contacts P with first clamp portion 21 and second clamp portion 22 of female fitting member Bf.

Because tip thickness T of tip portion 11*a* of insert 11 is smaller than spacing width R of receiving portion 26, insert 11 is permitted to become offset by a greater degree at the initial stage of insertion illustrated in FIG. 9A, and therefore, an acceptable range of precision at which male fitting members Bm and female fitting member Bf are bonded to the printed circuit board is also increased. Therefore, it is possible to reduce the managed hours required in the process of assembling electric power converter 1.

In addition, as illustrated in FIG. 9B, when male fitting member Bm is brought into contact with female fitting member Bf at first, the inclined portion of tip portion 11*a* of insert 11 comes into contact with first clamp portion 21 and second clamp portion 22. Therefore, insertion damages of the contact points can be reduced. For example, if tip thickness T of tip portion 11*a* of insert 11 is equal to or larger than spacing width R of receiving portion 26, the tip of tip portion 11*a* may hit the surfaces of first clamp portion 21 and second clamp portion 22, and may damage female fitting member Bf on the surface that is to be electrical contact P or a surface nearby. As an example, plating formed on the surfaces of first clamp portion 21 and second clamp portion 22 may peel off, disadvantageously. By contrast, in the present exemplary embodiment, the tip surface of tip portion 11*a* of insert 11 is less likely to hit the surface of first clamp portion 21 or second clamp portion 22. Therefore, female fitting member Bf is damaged less at the time of insertion, and electrically preferable electrical contact P can be achieved upon completion of the insertion, as illustrated in FIG. 9C.

As described above, electric power converter 1 according to the exemplary embodiment includes first board PCB1, second board PCB2, and first board-to-board connectors B1 interposed between first board PCB1 and second board PCB2 and electrically and mechanically connecting first board PCB1 and second board PCB2. Each of first board-to-board connectors B1 includes male fitting member Bm that includes insert 11 having a substantially flat plate-like shape and that is disposed on one of first board PCB1 and second board PCB2, and female fitting member Bf that includes first clamp portion 21 and second clamp portion 22 facing each other and that is disposed on the other one of first board PCB1 and second board PCB2. First clamp portion 21 includes first contact forming portion 211 disposed in the tip section of first clamp portion 21 and curved in a shape protruding toward second clamp portion 22, and first spring portion 212 disposed in the base section of first clamp portion 21, connected to first contact forming portion 211, and curved in a shape corrugated toward second clamp portion 22. Second clamp portion 22 includes second contact forming portion 221 disposed in the tip section of second clamp portion 22 and curved in a shape protruding toward first clamp portion 21, and second spring portion 212 disposed in the base section of second clamp portion 22, connected to second contact forming portion 221, and curved in a shape corrugated toward first clamp portion 21. Insert 11 clamped between first contact forming portion 211 and second contact forming portion 221 forms electrical contact P, and first spring portion 212 and second spring portion 222 are independently deformable.

In addition, board-to-board connector B according to the exemplary embodiment is a board-to-board connector that is interposed between first board PCB1 and second board PCB2, and that electrically and mechanically connects first board PCB1 and second board PCB2, and that includes male fitting member Bm having insert 11 having a substantially flat-plate like shape and disposed on one of first board PCB1 and second board PCB2, and female fitting member Bf having first clamp portion 21 and second clamp portion 22 that face each other, and disposed on the other one of first board PCB1 and second board PCB2. First clamp portion 21 includes first contact forming portion 211 disposed in the tip section of first clamp portion 21 and curved in a shape protruding toward second clamp portion 22, and first spring portion 212 disposed in the base section of first clamp portion 21, connected to first contact forming portion 211, and curved in a shape corrugated toward second clamp portion 22. Second clamp portion 22 includes second contact forming portion 221 disposed in the tip section of second clamp portion 22 and curved in a shape protruding toward first clamp portion 21, and second spring portion 212 disposed in the base section of second clamp portion 22, connected to second contact forming portion 221, and curved in a shape corrugated toward first clamp portion 21. Insert 11 clamped between first contact forming portion 211 and second contact forming portion 221 forms electrical contact P, and first spring portion 212 and second spring portion 222 are independently deformable.

With electric power converter 1 and board-to-board connector B, the spring structure can efficiently absorb the vertical movements that may take place in electrical contact P, due to causes such as a change in temperature and a vibration. Therefore, it is possible to maintain a good coupling condition of electrical contact P for a long time period, and to suppress a characteristic deterioration of electrical connection P over time.

Specifically, the interface of the electrical contact may oxidize due to the usage environment or temperature changes caused by currents switched between on and off, and such oxidization may cause a characteristic deterioration of the electrical contact. In addition, repeated temperature changes may cause dimensional changes, which may result in very small deformations of the members making up the board-to-board connector, or may cause the members to slide against one another. Such deformation may decrease the contact pressure between elements such as connectors maintaining the connection, and the sliding movements may cause a characteristic deterioration of the electrical contact. Furthermore, similar defects may occur in the board-to-board connector not only due to dimensional changes caused by changes in temperature, but also due to dimensional changes caused by vibrations of the device in the usage environment. With electric power converter 1 and board-to-board connector B, it is possible to prevent such defects.

In addition, in electric power converter 1, when the coupling structure between the printed circuit boards is assembled, it is possible to reduce the number of hours required in assembling electric power converter 1, because it is easy to mount male fitting members Bm and female fitting members Bf on the surface.

Furthermore, because the width of the insert 11 can be set to an appropriate width, by increasing the width of insert 11 of male fitting member Bm, it is possible to increase the acceptable range of positional precision at which male fitting member Bm1 is fitted into female fitting member Bf1. A wider acceptable range leads to an increase in the acceptable range of precision at which male fitting member Bm1 and female fitting member Bf1 are mounted, so that it is possible to reduce the managed hours required in assembling electric power converter 1.

In electric power converter 1, each of contact forming portions 211 and 221 has a convex surface. With this, insert 11 of male fitting member Bm can be smoothly inserted into receiving portion 26 of female fitting member Bf.

In electric power converter 1, first clamp portion 21 has a plurality of first clamp pieces 21A and 21B that are disposed spaced from each other, and second clamp portion 22 has a plurality of second clamp pieces 22A and 22B that are disposed spaced from each other. First spring portions 212 of respective first clamp pieces 21A and 21B and second spring portions 222 of respective second clamp pieces 22A and 22B are independently deformable.

As a result, it is possible to efficiently absorb not only the movements in the vertical direction but also the movements in the rotational direction that may take place in electrical contact P due to causes such as a change in temperature and a vibration. Therefore, it is possible to maintain a good coupling condition of electrical contact P for a long time period, and to suppress a characteristic deterioration over time.

In electric power converter 1, first clamp piece 21A is disposed facing second clamp piece 22A, and first clamp piece 21B is disposed facing second clamp piece 22B, in the direction facing insert 11. In this configuration, because the structure of female fitting member Bf is symmetrical, designing and manufacturing can be simplified, and it is not necessary to pay attention to the direction of female fitting member Bf when the female member Bf is mounted on the printed circuit board.

In electric power converter 1, first clamp pieces 21A to 21C and second clamp pieces 22A and 22B are disposed at staggered positions in the direction extending toward insert 11. As a result, insert 11 of male fitting member Bm is firmly held thereby, so that extremely stable fitting connection is achieved.

In addition, in electric power converter 1, insert 11 has constricted portion 11*a* recessed in the width directions, and width W1 of the constricted portion 11*a* is smaller than width W2 of larger one of first clamp portions 21A and 21B and the second clamp portions 22A and 22B.

With these, when vibration or the like occurs in electrical contact P in the rotational direction around the vertical direction as the rotation axis, the amount of rotation is reduced by the twisting movement of constricted portion 14. Therefore, vibration in the rotation direction generated around electrical contact P can be efficiently absorbed, and an extremely stable electrical contact P can be realized.

In electric power converter 1, each of male fitting members Bm and female fitting members Bf is made of a metal material.

Preferably, the metal material is copper, a copper alloy including brass, aluminum, or an aluminum alloy.

In addition, conductor plating is preferably applied to a part or whole of the surface area of the metal material.

Furthermore, the conductor plating is tin plating, silver plating, or gold plating.

With these, it is possible to suppress deterioration of electrical contact P due to a temperature rise, and to ensure quality of electrical contact P.

In electric quantity converter 1, electrical contact P has a contact resistance of 1 mΩ or lower between insert 11 and each of first contact forming portion 211 and the second contact forming portion 221. With this, it is possible to suppress temperature rise attributable to the contact resistance.

In addition, electric power converter 1 further includes third board PCB3, and a plurality of second board-to-board connectors B2 interposed between second board PCB2 and third board PCB3 and electrically and mechanically connecting second board PCB2 and third board PCB3, and second board-to-board connectors B2 have the same configuration as first board-to-board connectors B1. With this, an excellent electrical connection structure can be achieved between three or more boards.

In addition, in electric power converter 1, first board PCB1, second board PCB2, and third board PCB3 form a three-layer stack structure, and male fitting members Bm or female fitting members Bf are disposed on each surface of second board PCB2 at an intermediate layer of the stack structure. In other words, second board PCB2 is disposed between first board PCB1 and third board PCB3. With this, the boards having the stack structure can be connected easily by fitting.

Although the disclosure made by the inventor of the present invention has been specifically described above based on the exemplary embodiment, the present disclosure is not limited to the above exemplary embodiment, and may be modified within the scope not departing from the spirit of the present disclosure.

For example, the width of insert 11 of male fitting member Bm and the number of clamp pieces included in first clamp portion 21 and second clamp portion 22 of female fitting members Bf may be set in any way. By increasing the number of clamp pieces of female fitting member Bf, the number of contacts in electrical contact P can be increased, and the contact resistance can be reduced further.

The protruding shape of the clamp piece forming electrical contact P on female fitting member Bf may be set in any way. For example, by setting the curvature radius of the protruding surface large, the contact area of the contact portion can be increased, and the contact resistance can be reduced.

In addition, the lengths of male fitting members Bm1 and female fitting members Bf1 may be set to desirable lengths, appropriately, depending on factor such as the distance between the boards to be coupled.

In the exemplary embodiment, the plurality of male fitting members Bm are disposed on first board PCB1 and third board PCB3, and the plurality of female fitting members Bf are disposed on both principal surfaces of second board PCB2. However, the present disclosure is not limited to the exemplary embodiment.

For example, a plurality of female fitting members Bf may be disposed on first board PCB1 and third board PCB3, and a plurality of male fitting members Bm may be disposed on both principal surfaces of second board PCB2. Furthermore, for example, the plurality of male fitting members Bm may be disposed on one principal surface of second board PCB2, and the plurality of female fitting members Bf may be disposed on the other principal surface. For example, male fitting members Bm and female fitting members Bf may be mixed on one principal surface of each of first board PCB1, second board PCB2, and third board PCB3.

The following exemplary embodiments provide an electric power converter and a board-to-board connector capable of connecting boards appropriately, and improving productivity and electrical characteristics.

(15) An electric power converter according to one aspect of the present disclosure includes:

a first board;

a second board; and a board-to-board connector interposed between the first board and the second board, the board-to-board connector electrically and mechanically connecting the first board and the second board, the board-to-board connector includes:

a male fitting member disposed on one of the first board and the second board;

a male-side solder layer interposed between the male fitting member and the one of the first board and the second board; and a male-side holding member disposed on the one of the first board and the second board in a manner surrounding the male fitting member;

a female fitting member disposed on the other one of the first board and the second board;

a female-side solder layer interposed between the female fitting member and the other one of the first board and the second board; and a female-side holding member disposed on the other one of the first board and the second board in a manner surrounding the female fitting member, and the male fitting member is fitted into the female fitting member to form an electrical contact.

(16) In the electric power converter according to (15), the male-side holding member may have a heat resistance not deforming at a melting point of a solder material making up the male-side solder layer, and the female-side holding member may have a heat resistance not deforming at the melting point of the solder material making up the female-side solder layer.

(17) The electric power converter according to (15) or (16) may further include:

a male-side adhesive layer interposed between the one of the first board and the second board and the male-side holding member; and a female-side adhesive layer interposed between the other one of the first board and the second board and the female-side holding member.

(18) In the electric power converter according to (17), the male-side adhesive layer may be formed of an adhesive that cures at a temperature lower than the melting point of the solder material forming the male-side solder layer, and the female-side adhesive layer may be formed of an adhesive that cures at a temperature lower than the melting point of the solder material forming the female-side solder layer.

(19) In the electric power converter according to any one of (15) to (18), the male-side holding member may have an opening into which the male fitting member is inserted after the male-side holding member is provided, and the female-side holding member may have an opening into which the female fitting member is inserted after the female-side holding member is provided.

(20) In the electric power converter according to any one of (15) to (19), the male-side holding member and the female-side holding member may be in contact with each other.

(21) In the electric power converter according to any one of (15) to (20), the male fitting member may include an insert having a substantially flat plate-like shape, the female fitting member may include a first clamp portion and a second clamp portion that are disposed facing each other and between which the insert is clamped, and the electrical contact may be formed by the insert being clamped between the first clamp portion and the second clamp portion.

(22) A board-to-board connector according to one aspect of the present disclosure is a board-to-board connector that is interposed between the first board and the second board and that electrically and mechanically connects the first board and the second board, the board-to-board connector includes:

a male fitting member disposed on one of the first board and the second board;

a male-side solder layer interposed between the male fitting member and the one of the first board and the second board;

a male-side holding member disposed on the one of the first board and the second board in a manner surrounding the male fitting member;

a female fitting member disposed on the other one of the first board and the second board;

a female-side solder layer interposed between the female fitting member and the other one of the first board and the second board; and a female-side holding member disposed on the other one of the first board and the second board in a manner surrounding the female fitting member, and the male fitting member is fitted into the female fitting member to form an electrical contact.

Generally, in a process of mounting a connector on a circuit board, a plurality of connectors are bonded to the circuit board simultaneously, using reflow soldering. Therefore, the position where the connector is mounted is dependent on self-alignment by the surface tension of the molten solder, and may deviate from a design position, depending on how the paste-like solder material is applied (so-called mounting deviation). When connector mounting misalignment occurs, the circuit boards may fail to be connected to each other appropriately, and may cause a deterioration of productivity or electrical characteristics.

With the electric power converter and the board-to-board connector according to the present exemplary embodiment, the boards can be connected appropriately, and productivity and electrical characteristics can be improved.

<Male Fitting Member Bm3>

Figure 10C:
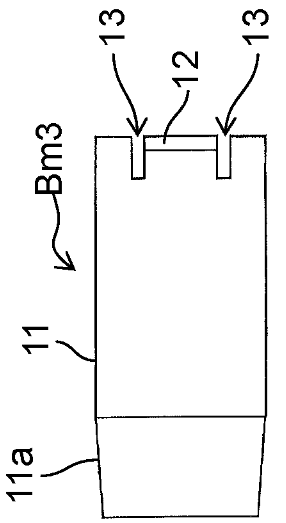
FIG. 10C is a schematic development view illustrating a schematic configuration of the one example of the male fitting member.
Figure 10E:
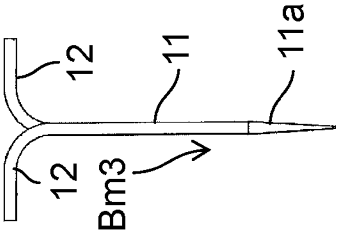
FIG. 10E is a schematic development view illustrating a schematic configuration of the one example of the male fitting member.
Figure 10A:
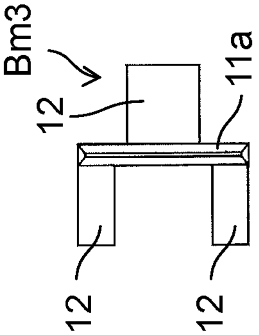
FIG. 10A is a schematic development view illustrating a schematic configuration of one example of a male fitting member.
Figure 10D:
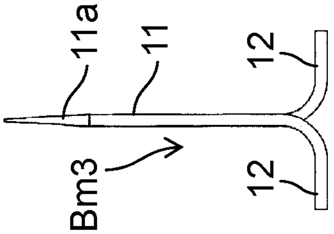
FIG. 10D is a schematic development view illustrating a schematic configuration of the one example of the male fitting member.
Figure 10B:
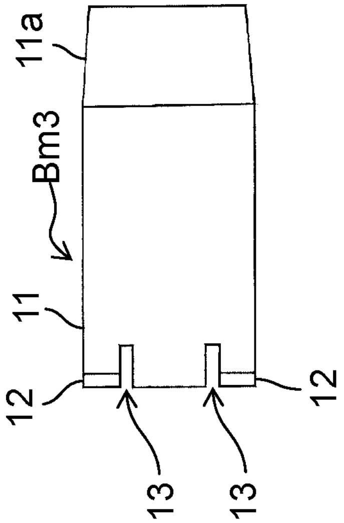
FIG. 10B is a schematic development view illustrating a schematic configuration of the one example of the male fitting member.

FIGS. 10A to 10E are schematic development views illustrating a schematic configuration of male fitting member Bm that is an example of male fitting member Bm3 illustrated in FIG. 1. FIG. 10A is a plan view of male fitting member Bm3 as viewed from the tip side of insert 11. FIG. 10B is a left side view, FIG. 10C is a right side view, FIG. 10D is a front view, and FIG. 10E is a rear view of male fitting member Bm3.

As illustrated in FIGS. 10A to 10E, male fitting member Bm3 includes insert 11 and board-connected portion 12. Male fitting member Bm3 is formed by cutting and bending a single metal plate, for example.

Insert 11 is a portion that is fitted into female fitting member Bf3 to form electrical contact P, and has a substantially flat plate-like shape. Tip portion 11*a* of insert 11 is chamfered, and the thickness thereof becomes smaller toward the tip. With this, insert 11 can be easily inserted into female fitting member Bf3.

Board-connected portion 12 is a portion connected to a printed circuit board (e.g., first board PCB1), and is provided to the base end of insert 11. Board-connected portion 12 is bonded at a predetermined position of the printed circuit board with reflow soldering, to electrically connect insert 11 to a wiring on the printed circuit board. Board-connected portions 12 are formed by bending the portions spaced by slits 13 in the alternating directions, substantially perpendicularly to insert 11, for example.

Note that the configuration of male fitting member Bm3 illustrated in FIGS. 10A to 10E is an example, and the detailed structure may be changed as appropriate. For example, the number of the board-connected portions 12 (the number of portions into which the base end of insert 11 is divided) may be changed to any number equal to or more than two. It is preferable to provide a larger number of board-connected portions 12 when insert 11 is longer. For example, insert 11 may have a shape of a pin, instead of a flat plate-like shape.

<Female Fitting Member Bf3>

Figures 11A, 11B, 11C, 11D, 11E:
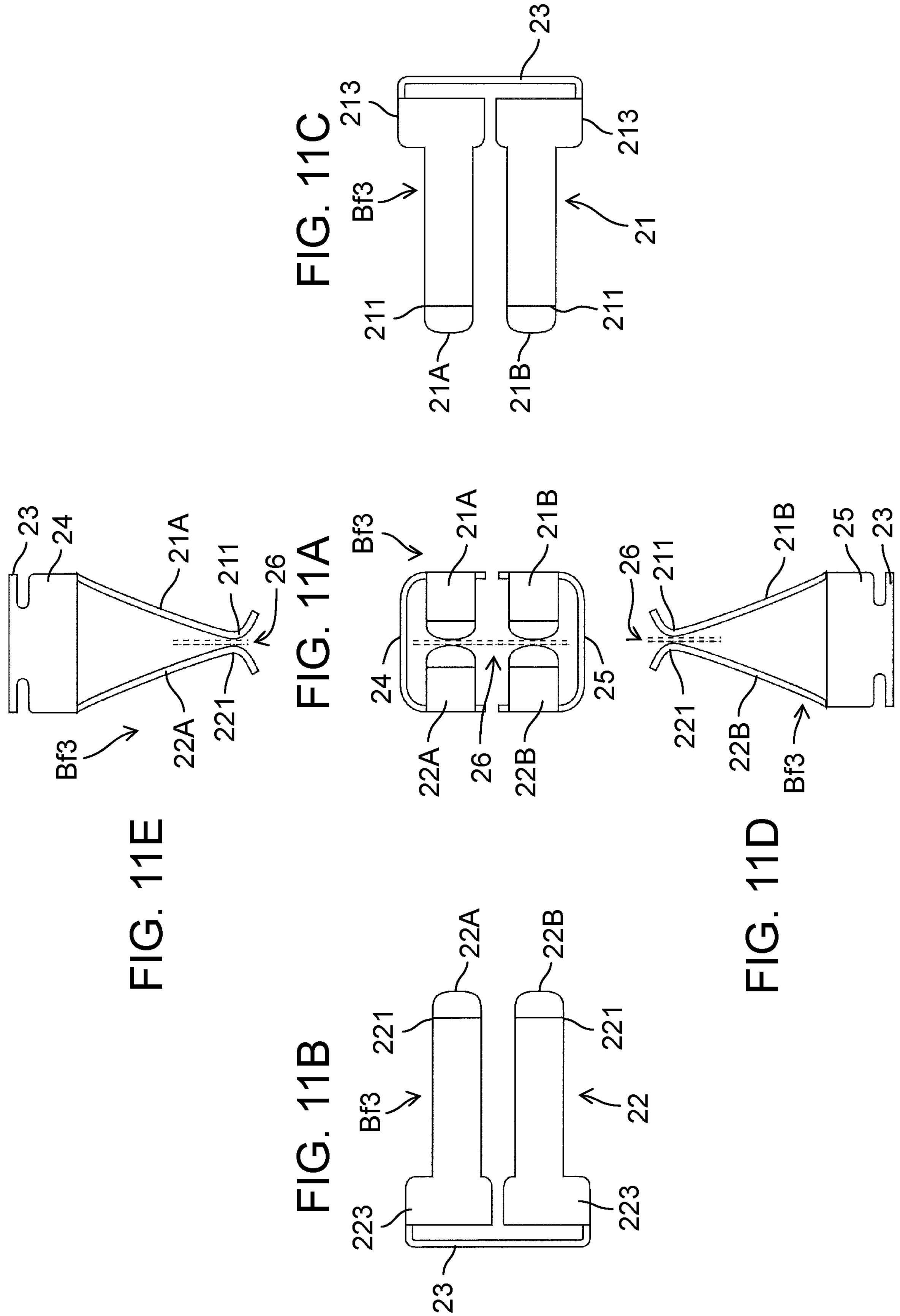
FIG. 11A is a developed schematic diagram illustrating a schematic configuration of one example of a female fitting member.
FIG. 11B is a schematic development view illustrating a schematic configuration of the one example of the female fitting member.
FIG. 11C is a schematic development view illustrating a schematic configuration of the one example of the female fitting member.
FIG. 11D is a schematic development view illustrating a schematic configuration of the one example of the female fitting member.
FIG. 11E is a schematic development view illustrating a schematic configuration of the one example of the female fitting member.

FIGS. 11A to 11E are schematic development views illustrating a schematic configuration of one example of female fitting member Bf3 illustrated in FIG. 1. FIG. 11A is a plan view of female fitting member Bf3 as viewed from the tip side of clamp portion 21 and clamp portion 22. FIG. 11B is a left side view, FIG. 11C is a right side view, FIG. 11D is a front view, and FIG. 11E is a rear view of female fitting member Bf3.

As illustrated in FIGS. 11A to 11E, female fitting member Bf3 includes first clamp portion 21, second clamp portion 22, board-connected portion 23, and joints 24 and 25. Female fitting member Bf3 is formed by, for example, cutting and bending of one metal plate.

Board-connected portion 23 is a portion connected to a printed circuit board (e.g., second board PCB2), and has a substantially rectangular shape in a plan view. Board-connected portion 23 is bonded at a predetermined position of the printed circuit board with reflow soldering, to electrically connect first clamp portion 21 and second clamp portion 22 to a wiring on the printed circuit board.

Joints 24 and 25 are portions that join first clamp portion 21 and second clamp portion 22 to board-connected portion 23. Joints 24 and 25 are bent substantially perpendicularly to board-connected portion 23.

First clamp portion 21 has two first clamp pieces 21A and 21B that are disposed side by side with a predetermined space therebetween. Second clamp portion 22 has two clamp pieces 22A and 22B that are disposed side by side with a predetermined space therebetween. In addition, first clamp portion 21 and second clamp portion 22, as a whole, are disposed facing each other with a predetermined space therebetween.

Specifically, first clamp piece 21A and second clamp piece 22A are disposed facing each other, as bent parts of base portion 213 and base portion 223, respectively, being bent substantially perpendicularly to joint 24. First clamp piece 21A and second clamp piece 22A are spaced with respect to each other from the tip to the base end thereof, and spacing width therebetween becomes smaller toward the tip.

Similarly, first clamp piece 21B and second clamp piece 22B are disposed facing each other, as bent parts of base portion 213 and base portion 223, respectively, being bent substantially perpendicularly to joint 25. First clamp piece 21B and second clamp piece 22B are spaced with respect to each other from the tip to the base end thereof, and spacing width therebetween becomes smaller toward the tip.

Receiving portion 26 is formed as a space between the tips of first clamp portion 21 and second clamp portion 22. Insert 11 of male fitting member Bm3 is inserted into receiving portion 26. First clamp portion 21 and second clamp portion 22 function as leaf springs, with insert 11 of male fitting member Bm3 is inserted therebetween, to press and to clamp insert 11.

First clamp portion 21 has first contact forming portions 211 in the tip sections of first clamp piece 21A and first clamp piece 21B, respectively. In the same manner, second clamp portion 22 has second contact forming portions 221 in the tip sections of second clamp piece 22A and second clamp piece 22B, respectively.

First contact forming portion 211 is curved in a shape protruding toward second clamp portion 22. Second contact forming portion 221 is curved in a shape protruding toward first clamp portion 21 (see FIGS. 11D, 11E). The curved part of first contact forming portion 211 and the curved part of second contact forming portion 221 are positioned nearest each other, and spacing width by which the curved parts are spaced from each other is set larger than the thickness of tip portion 11*a* of insert 11 of male fitting member Bm3 and smaller than the plate thickness of insert 11. The curved parts of first contact forming portion 211 and second contact forming portion 221 are brought into contact with insert 11 of male fitting member Bm3, and forms electrical contact P with insert 11.

The shape in which the curved part of each of first contact forming portion 211 and second contact forming portion 221 protrude preferably delineates a convex surface. In this manner, the resistance in inserting insert 11 of male fitting member Bm3 is reduced, so that male fitting member Bm3 can be easily fitted into female fitting member Bf3.

Note that the curved surface of each of first contact forming portion 211 and second contact forming portion 221 may be in any shape as long as electrical contact P can be formed with insert 11 of the male fitting member Bm3, by being firmly brought into contact therewith. For example, each of first contact forming portions 211 and second contact forming portions 221 may have a V shape or U shape formed by bending a metal plate into a smooth curve, or may be provided as a hemispherical protrusion provided to a facing surface of each of first contact forming portion 211 and second contact forming portion 221. Furthermore, the hemispherical protrusion may be provided in plurality on each of first contact forming portion 211 and second contact forming portion 221.

Female fitting member Bf3 includes first clamp pieces 21A and 21B in the number equal to the number of second clamp pieces 22A and 22B, and first clamp piece 21A is disposed facing second clamp piece 22A, and first clamp piece 21B is disposed facing second clamp piece 22B, along the directions facing insert 11. Rotational movements of electrical contact P caused by a change in temperature, a vibration, or the like can take place in any direction, but the structure described above can absorb such rotational movements.

Note that the configuration of female fitting member Bf3 illustrated in FIGS. 11A to 11E is an example, and the detailed structure may be changed as appropriate. For example, the number of first clamp pieces 21A and 21B, and the number of second clamp pieces 22A and 22B are not limited to those illustrated in the drawings such as FIG. 11A, and for example, three or more may be provided on one side, or may be provided at staggering positions in the direction in which first clamp portion 21 and the second clamp portion 22 face each other. For example, receiving portion 26 may be provided as a socket-shaped member in which pin-shaped insert 11 is received, instead of first clamp portions 21 and second clamp portions 22.

<Mounting of Male Fitting Member Bm3>

Figure 12A:
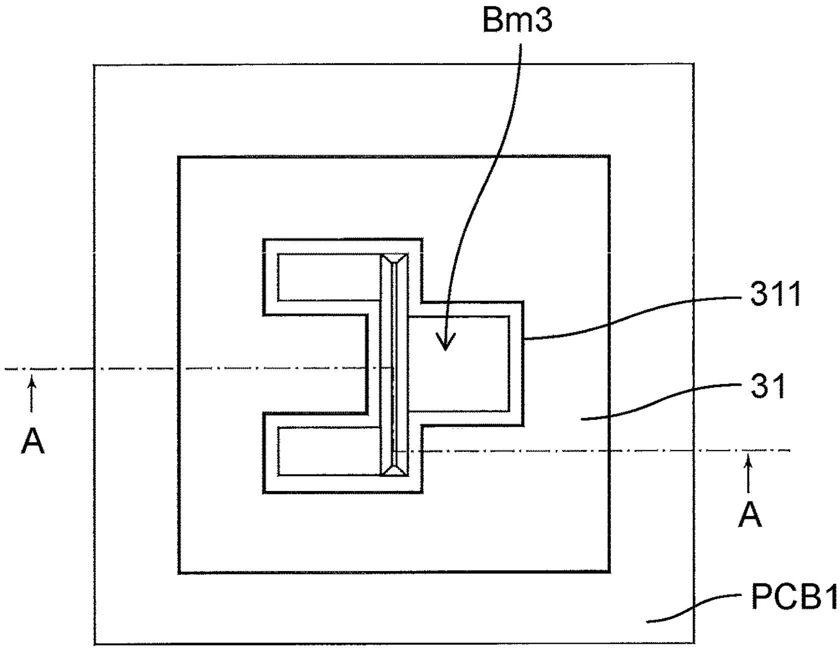
FIG. 12A is a schematic diagram illustrating one example of a mounted male fitting member.
Figure 12B:
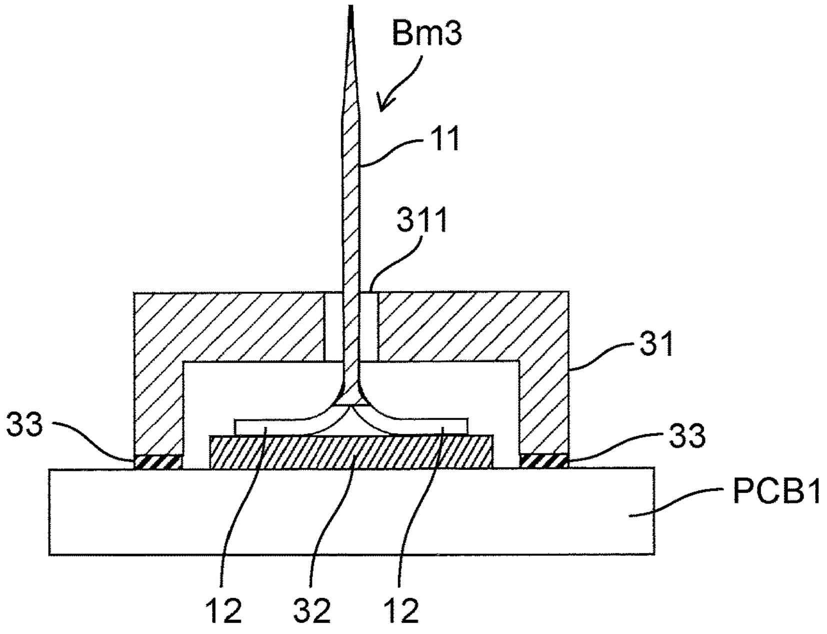
FIG. 12B is a schematic diagram illustrating the one example of the mounted male fitting member.

FIGS. 12A and 12B are schematic diagrams illustrating one example of the mounted male fitting member Bm3. FIG. 12A is a plan view of male fitting member Bm3 as viewed from the tip side of insert 11, and FIG. 12B is a cross-sectional view taken along line A-A in FIG. 12A. FIGS. 12A and 12B illustrate an example in which male fitting member Bm3 is mounted on first board PCB1.

Male fitting member Bm3 is bonded to the mounting surface of first board PCB1 by reflow soldering. Therefore, as illustrated in FIG. 12B, male-side solder layer 32 is interposed between board-connected portion 12 of male fitting member Bm3 and first board PCB1.

Furthermore, male-side holding member 31 is disposed on first board PCB1 in a manner surrounding male fitting member Bm3. Male-side holding member 31 restricts displacement of male fitting member Bm3 on the mounting surface caused by the self-alignment, in the process of bonding male fitting member Bm3 by reflow soldering.

Male-side holding member 31 has opening 311 having a shape slightly larger than the shape of male fitting member Bm3 in a plan view, that is, slightly larger than the footprint shape of board-connected portion 12 in a plan view. The peripheral edges of opening 311 is near insert 11 of male fitting member Bm3. Opening 311 passes through male-side holding member 31 so that male fitting member Bm3 can be inserted into male-side holding member 31 through opening 311, and mounted on first board PCB1.

The shape and size of opening 311 are set considering factors such as a part accuracy of male-side holding member 31, a part accuracy of male fitting member Bm3, and a mounting accuracy of the surface mounting device (mounter). For example, when the part accuracy of male-side holding member 31 is 0.1 [mm], the part accuracy of male fitting member Bm3 is 0.1 [mm], and the mounting accuracy of the surface mounting device is 0.03 [mm], the shape and size of opening 311 are designed taking the error of 0.23 [mm] into consideration.

In addition, the height of male-side holding member 31 is set in consideration of the length by which insert 11 of male fitting member Bm3 is inserted into female fitting member Bf3. In other words, insert 11 is set to protrude from opening 311 of male-side holding member 31 by a length longer than the length by which insert 11 is inserted.

Male-side holding member 31 has heat resistance of a level not causing a deformation during reflow soldering, that is, a level not causing a deformation at the melting point of solder material 32*a* of which male-side solder layer 32 is formed. Male-side holding member 31 is formed of, for example, a resin material such as polyether ether ketone, polyimide, silicone, or a fluorine-based resin. In addition, as a material for forming male-side holding member 31, for example, a metal material such as aluminum, copper, or iron, or an oxide-based, nitride-based, or carbide-based ceramic material may be used.

Male-side holding member 31 is fixed to the mounting surface of first board PCB1 with an adhesive. Therefore, as illustrated in FIG. 12B, male-side adhesive layer 33 is interposed between male-side holding member 31 and first board PCB1. As the adhesive for forming male-side adhesive layer 33, for example, a thermosetting or ultraviolet curing adhesive is used. When the thermosetting adhesive is used, boding of male-side holding member 31, and reflow-soldering of male fitting member Bm3 may be performed in a single run of continuous heat treatment.

In the present exemplary embodiment, male-side holding member 31 includes a peripheral wall disposed on first board PCB1. The peripheral wall surrounds male fitting member Bm3 continuously. In the present exemplary embodiment, the peripheral wall has a quadrangular shape, but the shape is not limited thereto. For example, the peripheral wall may have a ring-like shape, or may be a polygonal shape other than a quadrangle. Male-side holding member 31 may further include a top plate connected to the peripheral wall. The top plate may have an opening through which insert 11 of male-side holding member 31 is passed.

A process of mounting male fitting member Bm3 will now be explained. FIGS. 13A to 13D are schematic diagrams illustrating an example of the process of mounting male fitting member Bm3.

Figure 13A:
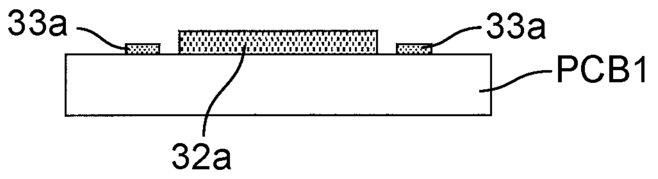
FIG. 13A is a schematic diagram illustrating one example of a process of mounting a male fitting member.

To begin with, as illustrated in FIG. 13A, paste-like solder material 32*a* for forming male-side solder layer 32 is applied to first board PCB1. Solder material 32*a* is applied to the mounting surface of first board PCB1 by, for example, mask printing or using a dispenser. The order in which the solder material and the adhesive are applied may be reversed.

As illustrated in FIG. 13A, thermosetting adhesive 33*a* for forming male-side adhesive layer 33 is applied to first board PCB1 in a manner surrounding solder material 32*a*. Adhesive 33*a* is applied to the mounting surface of first board PCB1 by mask printing or using a dispenser.

The melting point of solder material 32*a* and the curing temperature of adhesive 33*a* are preferably separated by 100° C. or more.

Figure 13B:
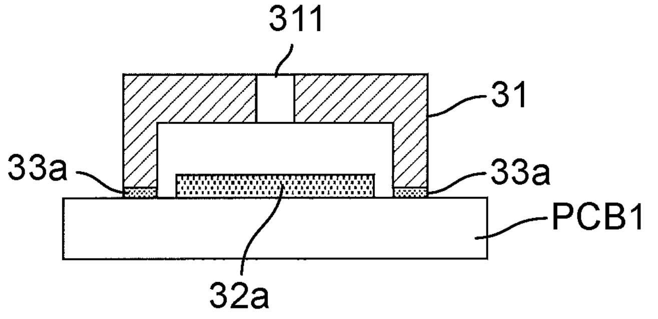
FIG. 13B is a schematic diagram illustrating the one example of the process of mounting the male fitting member.

Male-side holding member 31 is then disposed, as illustrated in FIG. 13B, on the uncured adhesive 33*a* at a high accuracy using a surface mounting device (mounter).

Figure 13C:
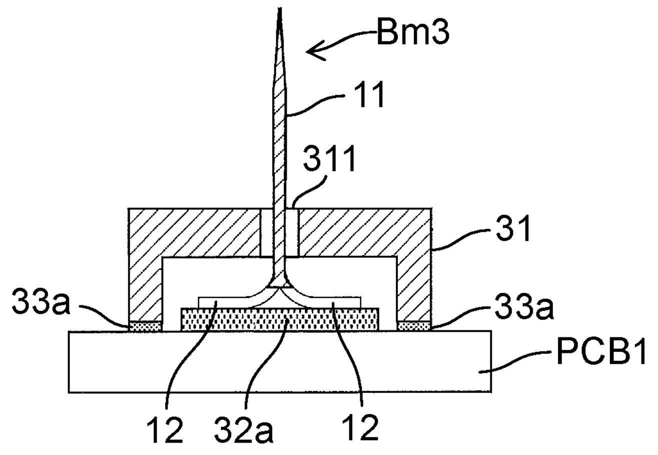
FIG. 13C is a schematic diagram illustrating the one example of the process of mounting the male fitting member.
Figure 13D:
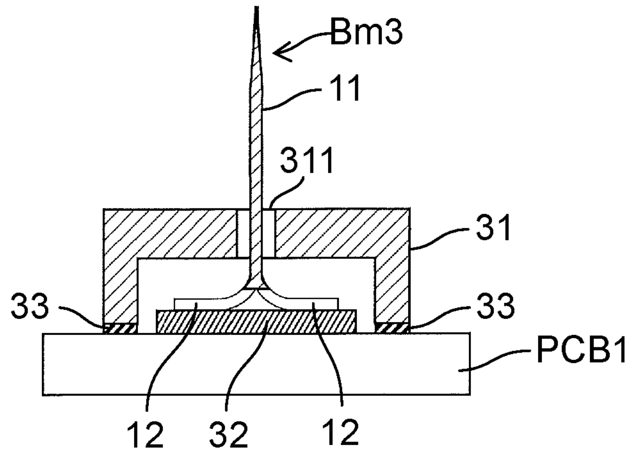
FIG. 13D is a schematic diagram illustrating the one example of the process of mounting the male fitting member.

Male fitting member Bm3 is then inserted through opening 311 of male-side holding member 31, and disposed on solder material 32*a*, as illustrated in FIG. 13C.

Because insert 11 of male fitting member Bm3 protrudes from opening 311 of male-side holding member 31, by disposing male-side holding member 31 and then disposing male fitting member Bm3 subsequently, contact between the members can be better avoided, and the members can be disposed at appropriate positions.

A reflow device then applies heating at the curing temperature of adhesive 33*a* to cure the uncured adhesive 33*a*, so that male-side holding member 31 is fixed to first board PCB1. Male-side adhesive layer 33 is thus formed between first board PCB1 and male-side holding member 31 (see FIG. 13D).

Furthermore, the solder material 32*a* is caused to melt by heating at a high temperature equal to or higher than the melting point of solder material 32*a*, so that male fitting member Bm3 is bonded to first board PCB1 (reflow soldering step). Solder layer 32 is thus formed between first board PCB1 and male fitting member Bm3 (see FIG. 13D). By then cooling for a predetermined time, male fitting member Bm3 is completely mounted on first board PCB1.

In the reflow soldering step described above, male fitting member Bm3 goes through self-alignment because of the surface tension of molten solder material 32*a*, and the position where male fitting member Bm3 is mounted on the mounting surface becomes displaced. In the present exemplary embodiment, because male-side holding member 31 is provided around male fitting member Bm3, male-side holding member 31 limits the amount of this displacement. In other words, male-side holding member 31 having been disposed at a high accuracy suppresses a deviation in the position where male fitting member Bm3 is mounted, so that male fitting member Bm3 is bonded at an appropriate mounting position.

<Mounting of Female Fitting Member Bf3>

Figure 14A:
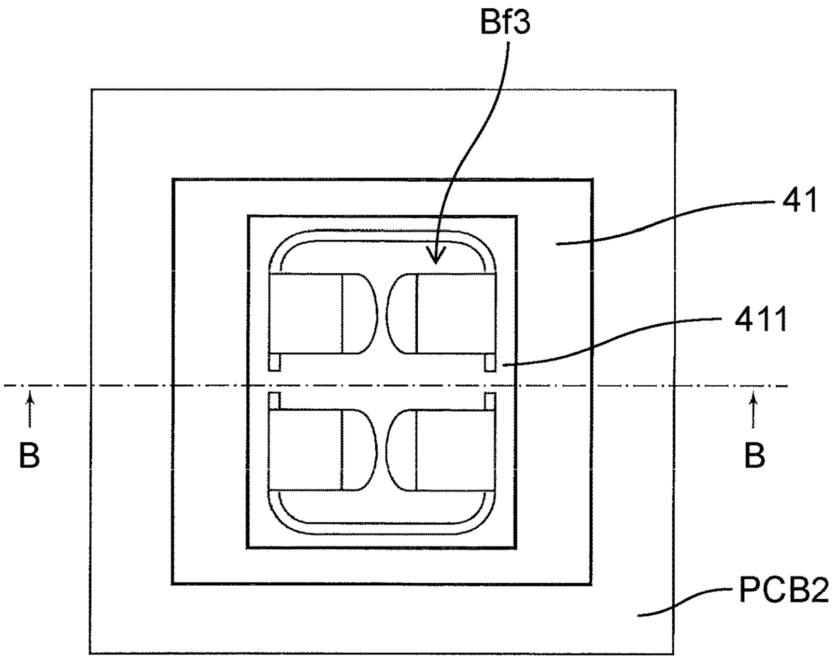
FIG. 14A is a schematic diagram illustrating one example of a mounted female fitting member.
Figure 14B:
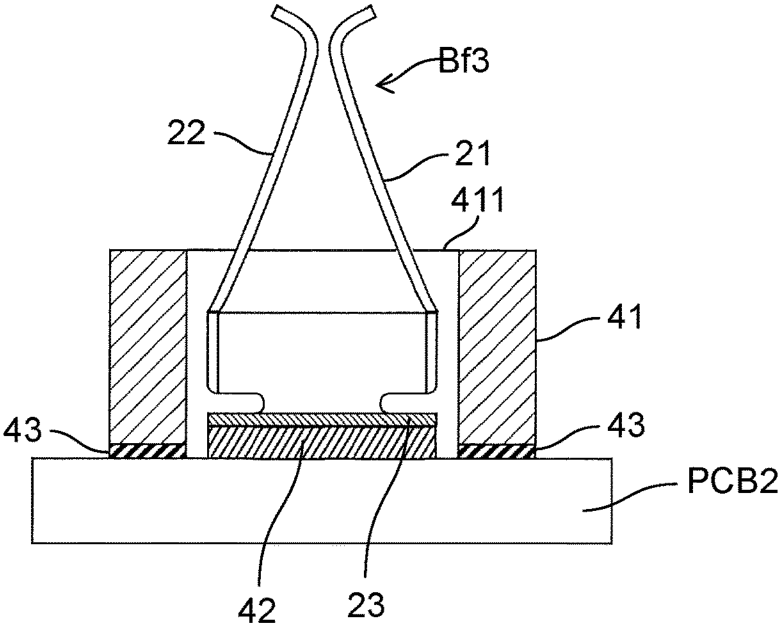
FIG. 14B is a schematic diagram illustrating the one example of the mounted female fitting member.

FIGS. 14A and 14B are schematic diagrams illustrating one example of the mounted female fitting member Bf3. FIG. 14A is a plan view of female fitting member Bf3 as viewed from the tip side of receiving portion 26, and FIG. 14B is a cross-sectional view taken along line B-B in FIG. 14A. FIGS. 14A and 14B illustrate an example in which female fitting member Bf3 is mounted on second board PCB2.

Female fitting member Bf3 is bonded to the mounting surface of second board PCB2 by reflow soldering. Therefore, as illustrated in FIG. 14B, female-side solder layer 42 is interposed between board-connected portion 23 of female fitting member Bf3 and second board PCB2.

Furthermore, female-side holding member 41 is disposed on second board PCB2 in a manner surrounding female fitting member Bf3. Female-side holding member 41 restricts displacement of female fitting member Bf3 on the mounting surface due to the self-alignment, when female fitting member Bf3 is bonded by reflow soldering.

Female-side holding member 41 has opening 411 having a shape slightly larger than the shape of female fitting member Bf3 in a plan view, that is, slightly larger than the footprint shape of board-connected portion 23 in a plan view. The peripheral edges of opening 411 is near the base portion 213 of first clamp portion 21, the base portion 223 of second clamp portion 22, and joints 24 and 25 of female fitting member Bf3. Opening 411 passes through female-side holding member 41 so that female fitting member Bf3 can be inserted into female-side holding member 41 through opening 411, and mounted on second board PCB2.

The shape and size of opening 411 are set considering factors such as a part accuracy of female-side holding member 41, a part accuracy of female fitting member Bf3, and a mounting accuracy of the surface mounting device (mounter). For example, when the part accuracy of female-side holding member 41 is 0.1 [mm], the part accuracy of female fitting member Bf3 is 0.1 [mm], and the mounting accuracy of the surface mounting device is 0.03 [mm], the shape and size of opening 411 are designed taking the error of 0.23 [mm] into consideration.

The height of female-side holding member 41 is not particularly limited as long as it does not interfere with male-side holding member 31.

Female-side holding member 41 has heat resistance of a level not causing a deformation during reflow soldering, that is, a level not causing a deformation at the melting point of solder material 42*a* of which female-side solder layer 42 is formed. Female-side holding member 41 is formed of, for example, a resin material such as polyether ether ketone, polyimide, silicone, or a fluorine-based resin. In addition, as a material for forming female-side holding member 41, for example, a metal material such as aluminum, copper, or iron, or an oxide-based, nitride-based, or carbide-based ceramic material may be used.

Female-side holding member 41 is fixed to the mounting surface of second board PCB2 with an adhesive. Therefore, as illustrated in FIG. 14B, female-side adhesive layer 43 is interposed between female-side holding member 41 and second board PCB2. As the adhesive for forming female-side adhesive layer 43, for example, a thermosetting or ultraviolet curing adhesive is used. When the thermosetting adhesive is used, bonding of female-side holding member 41, and reflow-soldering of female fitting member Bf3 may be performed in a single run of continuous heat treatment.

In the present exemplary embodiment, female-side holding member 41 includes a peripheral wall disposed on second board PCB2. The peripheral wall surrounds female fitting member Bf3 continuously. In the present exemplary embodiment, the peripheral wall has a quadrangular shape, but the shape is not limited thereto. For example, the peripheral wall may have a ring-like shape, or may be a polygonal shape other than a quadrangle.

A process of mounting female fitting member Bf3 will now be explained. FIGS. 15A to 15D are schematic diagrams illustrating an example of the process of mounting female fitting member Bf3.

Figure 15A:
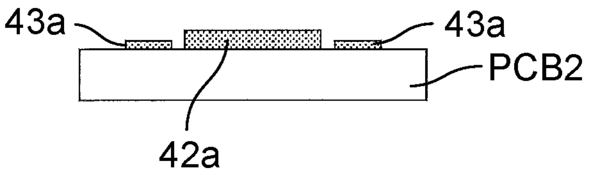
FIG. 15A is a view illustrating one example of a process of mounting a female fitting member.

To begin with, as illustrated in FIG. 15A, paste-like solder material 42*a* for forming female-side solder layer 42 is applied to second board PCB2. Solder material 42*a* is applied to the mounting surface of second board PCB2 by, for example, mask printing or using a dispenser.

As illustrated in FIG. 15A, thermosetting adhesive 43*a* for forming female-side adhesive layer 43 is applied to second board PCB2 in a manner surrounding solder material 42*a*. Adhesive 43*a* is applied to the mounting surface of second board PCB2 by mask printing or using a dispenser.

The melting point of solder material 42*a* and the curing temperature of adhesive 43*a* are preferably separated by 100° C. or more.

Figure 15B:
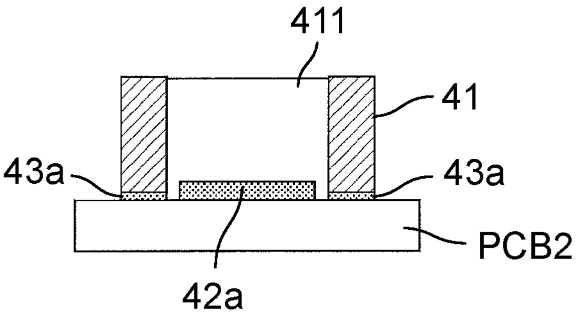
FIG. 15B is a view illustrating the one example of the process of mounting the female fitting member.

Female-side holding member 41 is then disposed, as illustrated in FIG. 15B, on the uncured adhesive 43*a* at a high accuracy using a surface mounting device (mounter).

Figure 15C:
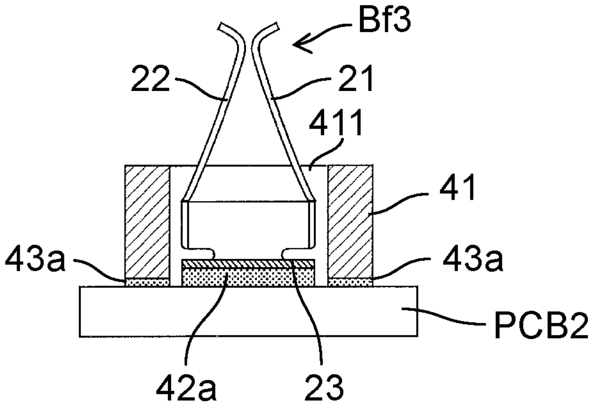
FIG. 15C is a view illustrating the one example of the process of mounting the female fitting member.
Figure 15D:
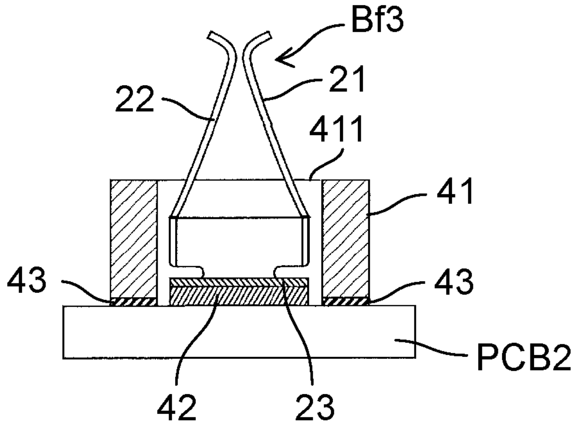
FIG. 15D is a view illustrating the one example of the process of mounting the female fitting member.

Female fitting member Bf3 is then inserted through opening 411 of female-side holding member 41, and disposed on solder material 42*a*, as illustrated in FIG. 15C.

Because first clamp portion 21 and second clamp portion 22 of female fitting member Bf3 protrude from opening 411 of female-side holding member 41, by disposing female-side holding member 41 and then disposing female fitting member Bf3 subsequently, contact between the members can be better avoided, and the members can be disposed at appropriate positions.

A reflow device then applies heating at the curing temperature of adhesive 43*a* to cure the uncured adhesive 43*a*, so that female-side holding member 41 is fixed to second board PCB2. Female-side adhesive layer 43 is thus formed between second board PCB2 and female-side holding member 41 (see FIG. 15D).

Furthermore, solder material 42*a* is caused to melt by heating at a high temperature equal to or higher than the melting point of solder material 42*a*, so that female fitting member Bf3 is bonded to second board PCB2 (reflow soldering step). Solder layer 42 is thus formed between second board PCB2 and female fitting member Bf3 (see FIG. 15D). By then cooling for a predetermined time, female fitting member Bf3 is completely mounted on second board PCB2.

In the reflow soldering step described above, female fitting member Bf3 goes through self-alignment because of the surface tension of molten solder material 42*a*, and the position where female fitting member Bf3 is mounted on the mounting surface becomes displaced. In the present exemplary embodiment, because female-side holding member 41 is provided around female fitting member Bf3, female-side holding member 41 limits the amount of this displacement. In other words, female-side holding member 41 having been disposed at a high accuracy suppresses a deviation in the position where female fitting member Bf3 is mounted, so that female fitting member Bf3 is bonded at an appropriate mounting position.

<Coupling Structure of Board Connector B>

Figure 16:
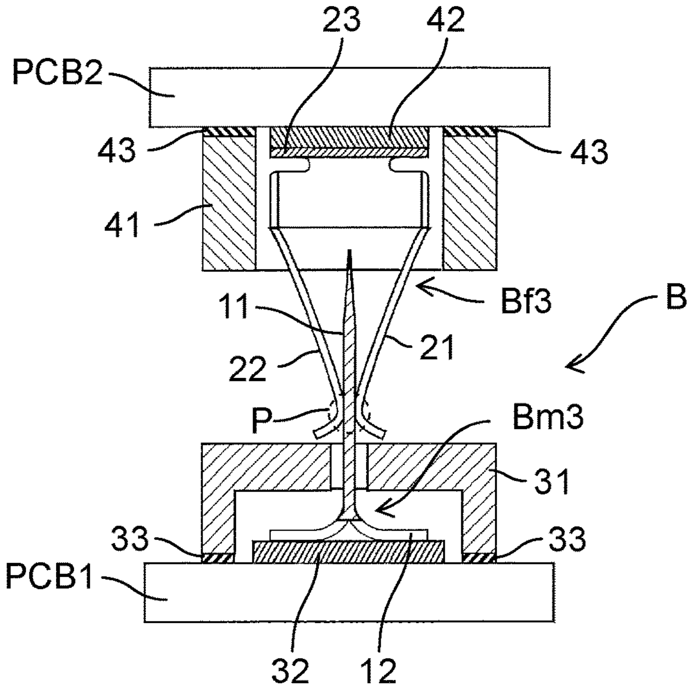
FIG. 16 is a schematic diagram illustrating one example of a coupling structure of a board-to-board connector.

FIG. 16 is a schematic diagram showing an example of a coupling structure of first board-to-board connector B1. Because the coupling structure of second board-to-board connector B2 is equivalent to the structure of first board-to-board connector B1 but upside down, the description thereof will be omitted.

As illustrated in FIG. 16, in first board-to-board connector B1, male fitting member Bm3 is mounted on first board PCB1, and female fitting member Bf3 is mounted on second board PCB2. Insert 11 of male fitting member Bm3 is then clamped between first clamp portion 21 and second clamp portion 22 of female fitting member Bf3, so that electrical contact P is formed thereby, and that first board PCB1 and second board PCB2 are electrically connected thereby.

In the present exemplary embodiment, male-side holding member 31 is provided around male fitting member Bm3, and female-side holding member 41 is provided around female fitting member Bf3. These structures suppress deviations of male fitting member Bm3 and female fitting member Bf3 from their respective mounting positions, so that male fitting member Bm3 and female fitting member Bf3 are mounted at predetermined mounting positions, respectively. Therefore, in the plurality of board-to-board connectors B of electric power converter 1, inserts 11 of respective male fitting members Bm3 are fitted into respective receiving portions 26 of female fitting members Bf3 appropriately, and electrical conductions therebetween are ensured.

As described above, electric power converter 1 according to the exemplary embodiment includes first board PCB1, second board PCB2, and board-to-board connectors B interposed between first board PCB1 and second board PCB2 and electrically and mechanically connecting first board PCB1 and second board PCB2. Board-to-board connector B includes male fitting member Bm3 disposed on first board PCB1 (one of the first board and the second board); male-side solder layer 32 interposed between first board PCB1 (the first board or the second board) and male fitting member Bm3; male-side holding member 31 disposed on first board PCB1 in a manner surrounding male fitting member Bm3 (the first board or the second board); female fitting member Bf3 disposed on second board PCB2 (the other of the first board and the second board); female-side solder layer 42 interposed between second board PCB2 (the first board or the second board) and female fitting member Bf3; and female-side holding member 41 disposed on second board PCB2 (the first board or the second board) in a manner surrounding female fitting member Bf3. By fitting male fitting member Bm3 and female fitting member Bf3, electrical contact P is formed.

Board connector B according to the exemplary embodiment is interposed between first board PCB1 and second board PCB2, and electrically and mechanically connects first board PCB1 and second board PCB2. Board connector B includes male fitting member Bm3 disposed on first board PCB1 (one of the first board and the second board); male-side solder layer 32 interposed between first board PCB1 (the first board or the second board) and male fitting member Bm3; male-side holding member 31 disposed on first board PCB1 in a manner surrounding male fitting member Bm3 (the first board or the second board); female fitting member Bf3 disposed on second board PCB2 (the other of the first board and the second board); female-side solder layer 42 interposed between second board PCB2 (the first board or the second board) and female fitting member Bf3; and female-side holding member 41 disposed on second board PCB2 (the first board or the second board) in a manner surrounding female fitting member Bf3. By fitting male fitting member Bm3 and female fitting member Bf3, electrical contact P is formed.

With electric power converter 1 and board-to-board connector B, mounting deviations in mounting male-side holding member 31 and female-side holding member 41 during the reflow soldering process is reduced. Therefore, the plurality of male fitting members Bm3 and the plurality of female fitting members Bf3 can be mounted at appropriate mounting positions by reflow soldering. Furthermore, in board-to-board connector B, male fitting members Bm3 are fitted to respective female fitting member Bf3 appropriately, and electrical conductions therebetween are ensured. Therefore, it becomes possible to connect the circuit boards appropriately, and to improve the productivity and electrical characteristics.

Furthermore, in electric power converter 1, male-side holding member 31 has a heat resistance of a level not deforming at a melting point of solder material 32*a* making up male-side solder layer 32, and female-side holding member 41 has a heat resistance of a level not deforming at the melting point of the solder material 42*a* making up the female-side solder layer 42.

As a result, it becomes possible to reduce mounting deviations of male fitting members Bm3 and female fitting members Bf3 during the reflow soldering process.

Electric power converter 1 further includes: male-side adhesive layer 33 interposed between first board PCB1 (the first board or the second board) and male-side holding member 31; and female-side adhesive layer 43 interposed between second board PCB2 (the first board or the second board) and female-side holding member 41.

With this configuration, male-side holding member 31 and female-side holding member 41 can be easily fixed to the circuit board highly accurately.

Furthermore, in the electric power converter 1, male-side adhesive layer 33 is formed of adhesive 33*a* that cures at a temperature lower than the melting point of solder material 32*a* forming male-side solder layer 32; female-side adhesive layer 43 is formed of adhesive 43*a* that cures at a temperature lower than the melting point of solder material 42*a* forming female-side solder layer 42.

As a result, male fitting member Bm3 and female fitting member Bf3 may be bonded to the circuit board by reflow soldering after male-side holding member 31 and female-side holding member 41 are fixed to the circuit board. In particular, when a thermosetting adhesive is used, bonding of male-side holding member 31 and female-side holding member 41, and reflow soldering of male fitting member Bm3 and female fitting member Bf3 may be performed in a single run of continuous heat treatment, so that production efficiency is improved.

Furthermore, in electric power converter 1, male-side holding member 31 has opening 311 into which male fitting member Bm3 is inserted after male-side holding member 31 is provided; and female-side holding member 41 may have opening 411 into which female fitting member Bf3 is inserted after female-side holding member 41 is provided.

With this configuration, male fitting member Bm3 and female fitting member Bf3 can be disposed after male-side holding member 31 and female-side holding member 41 are disposed on the circuit board. Therefore, the contact between the members can be better avoided, and male fitting member Bm3 and female fitting member Bf3 can be disposed at appropriate positions.

Furthermore, in the electric power converter 1, male fitting member Bm3 includes insert 11 having a substantially flat plate-like shape; female fitting member Bf3 includes first clamp portion 21 and second clamp portion 22 that are disposed facing each other and between which insert 11 is clamped, and electrical contact P is formed by insert 11 being clamped between first clamp portion 21 and second clamp portion 22.

With this configuration, the conductive state between male fitting member Bm3 and female fitting member Bf3 can be favorably maintained.

Although the disclosure made by the inventor of the present invention has been specifically described above based on the exemplary embodiment, the present disclosure is not limited to the above exemplary embodiment, and may be modified within the scope not departing from the spirit of the present disclosure.

For example, the lengths of male fitting members Bm3 and female fitting members Bf3 may be set to desirable lengths, appropriately, depending on factor such as the distance between the boards to be coupled.

Figure 17:
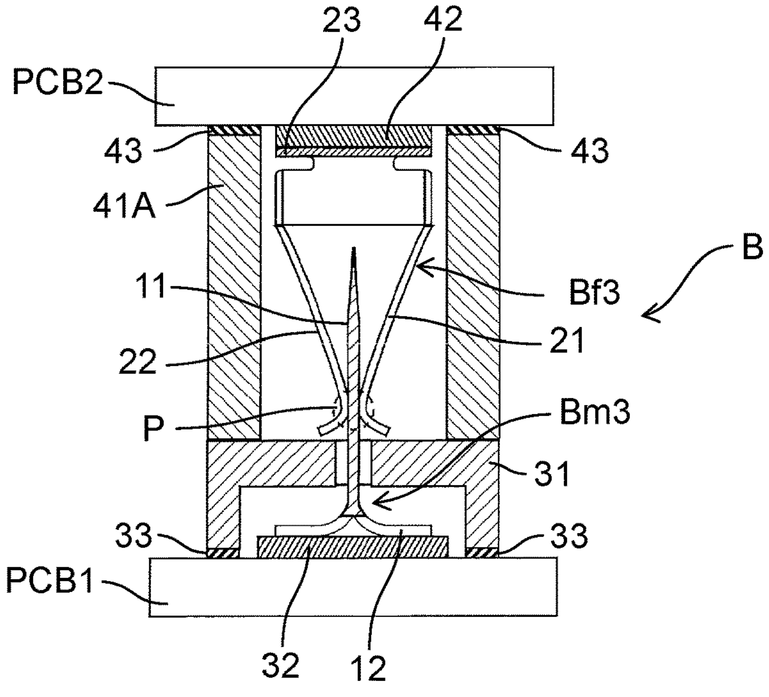
FIG. 17 is a schematic diagram illustrating another example of the coupling structure of the board-to-board connector.

Furthermore, as illustrated in FIG. 17, when male fitting member Bm3 and female fitting member Bf3 are fitted to each other, male-side holding member 31 and female-side holding member 41 may abut against each other. With this configuration, it is possible to ensure that heights resultant of fitting the fitting members are constant, so that it is possible to suppress tilting of the circuit board due to the difference in depth by which a large number of fitting members are fitted. In addition, when the circuit board warps due to heat during the use of electric power converter 1, it is possible to inhibits changes in the fitting condition of male fitting member Bm3 and female fitting member Bf3, so that it is possible to suppress an increase in contact resistance due to the sliding of electrical contact P.

In the exemplary embodiment, the plurality of male fitting members Bm3 are disposed on first board PCB1 and third board PCB3, and the plurality of female fitting members Bf3 are disposed on both principal surfaces of second board PCB2. However, the present disclosure is not limited to the exemplary embodiment.

For example, a plurality of female fitting members Bf3 may be disposed on first board PCB1 and third board PCB3, and a plurality of male fitting members Bm3 may be disposed on both principal surfaces of second board PCB2. Furthermore, for example, the plurality of male fitting members Bm3 may be disposed on one principal surface of second board PCB2, and the plurality of female fitting members Bf3 may be disposed on the other principal surface. For example, male fitting members Bm3 and female fitting members Bf3 may be mixed on one principal surface of each of first board PCB1, second board PCB2, and third board PCB3.

In addition, although the exemplary embodiment has illustrated the electric power converter including both male-side holding member 31 and female-side holding member 41, the present invention is not limited thereto. For example, the electric power converter may include only one of male-side holding member 31 and female-side holding member 41.

It should be construed that the exemplary embodiment disclosed herein is illustrative in all aspects, and is not restrictive. The scope of the present disclosure is represented by the scope of the claims and not by the above description, and it is intended that all modifications within the sense and scope equivalent to the claims are involved fall within the scope of the present disclosure.

INDUSTRIAL APPLICABILITY

According to the present disclosure, it is possible to eliminate a defect in an electrical contact due to factors such as a change in temperature or a vibration, in a board-to-board connector that electrically connects circuit boards. In addition, because a plurality of circuit boards can be stacked using a highly reliable board-to-board connector, it is particularly suitable for reducing the size of the electric power converter.

REFERENCE MARKS IN THE DRAWINGS

1 electric power converter
11 insert
11*a* tip portion
12 board-connected portion
13 slit
21 first clamp portion
21A, 21B first clamp piece
211 first contact forming portion
212 first spring portion
22 second clamp portion
22A, 22B second clamp piece
221 second contact forming portion
222 second spring portion
23 board-connected portion
24, 25 joint
26 receiving portion
PCB1 first board
PCB2 second board
PCB3 third board
B board-to-board connector
B1 first board-to-board connector
B2 second board-to-board connector
Bm, Bm1, Bm2, Bm3 male fitting member
Bf, Bf1, Bf2, Bf3 female fitting member

The invention claimed is:

1. An electric power converter comprising:
a first board;
a second board; and
a board-to-board connector interposed between the first board and the second board, the board-to-board connector electrically and mechanically connecting the first board and the second board, wherein
the board-to-board connector includes:
a male fitting member disposed on the first board;
a male-side holding member disposed on the first board in a manner surrounding the male fitting member; and
a female fitting member disposed on the second board,
the male fitting member includes an insert having a substantially flat plate shape,
the female fitting member has a first clamp portion and a second clamp portion facing each other,
the first clamp portion has a first clamp piece and a second clamp piece arranged side by side with a predetermined space therebetween,
the second clamp portion has a third clamp piece and a fourth clamp piece arranged side by side with a predetermined space therebetween,
the male fitting member is fitted into the female fitting member to form an electrical contact,
the male-side holding member is arranged to surround the male fitting member while being spatially separated,
the male-side holding member disposed on the first board includes a peripheral wall which continuously surrounds the male fitting member disposed on the first board, the peripheral wall having a quadrangular shape, and
the male-side holding member is formed separately from the female fitting member.

2. The electric power converter according to claim 1, further comprising:
a male-side solder layer interposed between the first board and the male-side holding member; and
a female-side solder layer interposed between the second board and a female-side holding member.

3. The electric power converter according to claim 2, wherein the male-side holding member has a heat resistance not deforming at a melting point of a solder material making up the male-side solder layer, and the female-side holding member has a heat resistance not deforming at the melting point of the solder material making up the female-side solder layer.

4. The electric power converter according to claim 1, further comprising:

a male-side adhesive layer interposed between the first board and the male-side holding member; and a female-side adhesive layer interposed between the second board and a female-side holding member.

5. The electric power converter according to claim 4, wherein the male-side adhesive layer is formed of an adhesive that cures at a temperature lower than the melting point of the solder material forming the male-side solder layer, and the female-side adhesive layer is formed of an adhesive that cures at a temperature lower than the melting point of the solder material forming the female-side solder layer.

6. The electric power converter according to claim 1, wherein the male-side holding member has an opening into which the male fitting member is inserted after the male-side holding member is provided.

7. A board-to-board connector that is interposed between a first board and a second board, and that electrically and mechanically connects the first board and the second board, the board-to-board connector comprising:

a male fitting member disposed on the first board;

a male-side holding member disposed on the first board in a manner surrounding the male fitting member; and a female fitting member disposed on the second board, wherein the male fitting member includes an insert having a substantially flat plate shape, the female fitting member has a first clamp portion and a second clamp portion facing each other, the first clamp portion has a first clamp piece and a second clamp piece arranged side by side with a predetermined space therebetween, the second clamp portion has a third clamp piece and a fourth clamp piece arranged side by side with a predetermined space therebetween, the male fitting member is fitted into the female fitting member to form an electrical contact, the male-side holding member is arranged to surround the male fitting member while being spatially separated, the male-side holding member disposed on the first board includes a peripheral wall which continuously surrounds the male fitting member disposed on the first board, the peripheral wall having a quadrangular shape, and the male-side holding member is formed separately from the female fitting member.

8. The electric power converter according to claim 1, wherein the male-side holding member is formed of a resin material.

9. The board-to-board connector according to claim 7, further comprising:

a male-side solder layer interposed between the first board and the male-side holding member; and a female-side solder layer interposed between the second board and a female-side holding member.

10. The board-to-board connector according to claim 9, wherein the male-side holding member has a heat resistance not deforming at a melting point of a solder material making up the male-side solder layer, and the female-side holding member has a heat resistance not deforming at the melting point of the solder material making up the female-side solder layer.

11. The board-to-board connector according to claim 7, further comprising:

a male-side adhesive layer interposed between the first board and the male-side holding member; and a female-side adhesive layer interposed between the second board and a female-side holding member.

12. The board-to-board connector according to claim 11, wherein the male-side adhesive layer is formed of an adhesive that cures at a temperature lower than the melting point of the solder material forming the male-side solder layer, and the female-side adhesive layer is formed of an adhesive that cures at a temperature lower than the melting point of the solder material forming the female-side solder layer.

13. The board-to-board connector according to claim 7, wherein the male-side holding member has an opening into which the male fitting member is inserted after the male-side holding member is provided.

14. The electric power converter according to claim 7, wherein the male-side holding member is formed of a resin material.

* * * * *